United States Patent
Shimizu et al.

(10) Patent No.: US 6,561,907 B2
(45) Date of Patent: May 13, 2003

(54) SIMULTANEOUS OR RECIPROCAL IMAGE SYNTHESIS FOR A VIDEO GAME AT DIFFERENT VIEWPOINTS

(75) Inventors: Shinichi Shimizu, Osaka (JP); Yoshiyuki Miyagawa, Tokyo (JP)

(73) Assignee: Square Co., Ltd., Tokyo (JP)

( * ) Notice: Subject to any disclaimer, the term of this patent is extended or adjusted under 35 U.S.C. 154(b) by 32 days.

(21) Appl. No.: 09/843,878

(22) Filed: Apr. 30, 2001

(65) Prior Publication Data

US 2002/0002077 A1 Jan. 3, 2002

(30) Foreign Application Priority Data

Jun. 5, 2000 (JP) .................................... 2000-168304

(51) Int. Cl.⁷ .............................................. A63F 13/00
(52) U.S. Cl. .................................................. 463/31
(58) Field of Search ........................ 463/30, 31; 345/473, 345/726, 419; 348/578, 239

(56) References Cited

U.S. PATENT DOCUMENTS

| | | | |
|---|---|---|---|
| 5,168,363 A | * 12/1992 | Kojima et al. | 348/704 |
| 5,252,953 A | * 10/1993 | Sandrew et al. | 345/473 |
| 5,490,238 A | * 2/1996 | Watkins | 345/422 |
| 5,568,598 A | * 10/1996 | Mack et al. | 345/595 |
| 5,600,370 A | * 2/1997 | Furuyama | 348/239 |
| 5,990,977 A | * 11/1999 | Kaneda et al. | 348/590 |
| 6,069,668 A | * 5/2000 | Woodham et al. | 348/578 |
| 6,115,076 A | * 9/2000 | Linzer | 348/239 |
| 6,198,873 B1 | * 3/2001 | Takano | 348/578 |
| 6,323,914 B1 | * 11/2001 | Linzer | 348/578 |

FOREIGN PATENT DOCUMENTS

JP          00112453         4/2000

OTHER PUBLICATIONS

English Language Abstract of –JP–2000–112453.

* cited by examiner

Primary Examiner—Michael O'Neill
(74) Attorney, Agent, or Firm—Greenblum & Bernstein, P.L.C.

(57) ABSTRACT

Images at a source side and a target side are displayed as a dynamic image that can move in real time by fading out the last scene and fading in a new scene. In the case of changing a viewpoint of a dynamic image to be displayed on a screen, a dynamic image (image depicted from a source camera) depicted from a viewpoint before changing the viewpoint and a dynamic image (image depicted from a target camera) depicted from a viewpoint after having changed the viewpoint are translucently synthesized, and a synthesized image is generated. Thereafter, with respect to the synthesized image, the source camera image (one frame image of the dynamic image) and the target camera image (one frame image of the dynamic image) are reciprocally translucently synthesized while changing the transparencies thereof. The image display is enabled, in which the transparency of the dynamic image depicted from the view point before changing the viewpoint is faded out, and at the same time, the transparency of the dynamic image depicted from the viewpoint after having changed the viewpoint can be faded in.

25 Claims, 17 Drawing Sheets

FIG. 5

CAMERA SELECTION TABLE 40

| CHARACTER POSITION | USABLE CAMERAS | SELECTION INDEX | DISPLAY TIME |
|---|---|---|---|
| AREA A | #1 | 20 | 7 ~ 10s |
| | #2 | 40 | 7 ~ 9s |
| | #3 | 30 | 3 ~ 5s |
| | ⋮ | ⋮ | ⋮ |
| AREA B | #1 | 10 | 5 ~ 6s |
| | #4 | 60 | 4 ~ 8s |
| | #5 | 30 | 4 ~ 8s |
| | ⋮ | ⋮ | ⋮ |
| ⋮ | ⋮ | ⋮ | ⋮ |

FIG. 9

| FRAME NUMBER | TRANSPARENCY OF SOURCE IMAGE | TRANSPARENCY OF TARGET IMAGE |
|---|---|---|
| #1 | 128 | 64 |
| #2 | 126 | 66 |
| #3 | 124 | 68 |
| #4 | 122 | 70 |
| #5 | 120 | 72 |
| ⋮ | ⋮ | ⋮ |
| #32 | 66 | 126 |
| #33 | 64 | 128 |

FIG. 16

| FRAME NUMBER | MULTIPLYING VALUE OF SOURCE IMAGE | SUBTRACTING VALUE OF TARGET IMAGE |
|---|---|---|
| #1 | 1.0 | 255 |
| #2 | (N-2)/(N-1) | 255 x (N-2)/(N-1) |
| #3 | (N-3)/(N-1) | 255 x (N-3)/(N-1) |
| ⋮ | ⋮ | ⋮ |
| #N-1 | 1/(N-1) | 255 x 1/(N-1) |
| #N | 0 | 0 |

SIMULTANEOUS OR RECIPROCAL IMAGE SYNTHESIS FOR A VIDEO GAME AT DIFFERENT VIEWPOINTS

CROSS REFERENCE TO RELATED APPLICATION

The present disclosure relates to subject matter contained in Japanese Patent Application No. 2000-168304, filed on Jun. 5, 2000, the disclosure of which is expressly incorporated herein by reference in its entirety.

BACKGROUND OF THE INVENTION

The present invention relates to a recording medium readable by a computer, in which a game program is stored, game program, game processing method, and game processing apparatus, and in particular, a computer-readable recording medium having a game program stored to achieve a process for displaying a dynamic image, a game program, a game processing method, and a game processing apparatus.

When a scene of a game to be displayed on a display is changed, an image from a viewpoint before the change and an image from a viewpoint after the change are synthesized, and an image display process is carried out so that the image from the viewpoint after the change is gradually made clear, whereby the stage effect of the game in a virtual space can be increased with the screen display.

As such a technology, there is, for example, a technology regarding changes of displayed scenes, which is disclosed in Japanese Laid-Open Patent Publication No. 2000-112453. The technology regarding the change of display scenes is such that holding image data (still image data) of the last scene is pasted on a plane polygon set further at the viewpoint side from an image expressing a new scene, using the image data of the last scene as a texture, and changing the display screen by gradually increasing the transparency of the image data expressing the last scene at every appointed cycle. Thereby, the display screen can be gradually changed from the last scene to a new scene by fading out the last scene and fading in the new scene.

In such a technology as disclosed in the above patent publication, however, an image of the last screen is limited to a still image constructed of a single frame. When a character in a game, that is moving with its action controlled in real time, is displayed on both the last and new scenes, an unnatural image display is brought about. Therefore, such a problem occurs in that, although a character is still in the image displayed from the last scene, the character is moving in real time in the image displayed from the viewpoint of the new scene.

The present invention was developed in order to solve such problems. It is therefore an object of the invention to provide a computer-readable recording medium having a stored game program, game program, game processing method, and game processing apparatus, in which both a source image and a target image can be displayed as dynamic images moving in real time when fading out the last scene and fading in a new scene.

SUMMARY OF THE INVENTION

In order to achieve the object, a computer-readable recording medium having a game program stored therein according to the invention is a recording medium, readable by a computer, in which a game program to achieve a process of displaying dynamic images on a screen is stored, which causes the computer to process image display. When a viewpoint for a dynamic image to be displayed on a screen is changed, the computer translucently synthesizes a dynamic image depicted from a viewpoint before the viewpoint is changed, and a dynamic image depicted from a viewpoint after the viewpoint is changed, together frame by frame of respective images. When a viewpoint for a dynamic image to be displayed is changed, the computer fades out the image by gradually increasing transparency of the dynamic image depicted from a viewpoint before the viewpoint is changed, and at the same time, fades in the image by gradually reducing the transparency of the dynamic image depicted from a viewpoint after the viewpoint is changed.

Also, in order to achieve the abovementioned object, a computer-readable recording medium having a game program stored therein according to the invention is a recording medium, readable by a computer, in which a game program to achieve a process of displaying dynamic images on a screen is stored, and causing the computer to execute programs displaying a first dynamic image depicted from a certain first viewpoint, which is composed of a plurality of image frames. When a viewpoint of a dynamic image to be displayed on a screen is changed, reciprocally adjusting brightness of one image frame of the first dynamic images and brightness of one image frame of the second dynamic images depicted from the second viewpoint, which consists of a plurality of image frames, acquiring a synthesized image frame by synthesizing the corresponding two image frames whose brightnesses were adjusted, and displaying the corresponding synthesized image frame; subsequently mutually selecting the brightness of the next image frame of the first dynamic images, and brightness of the next image frame of the second dynamic images whenever image frames to be displayed on a screen are renewed; and reciprocally adjusting the brightness of the synthesized image frame acquired by the last synthesis, and brightness of the reciprocally selected next image frame, acquiring a newly synthesized image frame by synthesizing the synthesized image frame whose brightness has been previously adjusted, and the image frame, and displaying the corresponding synthesized image frame.

A recording medium, readable by a computer, having a game program stored therein according the invention, which further stores the programs causing the computer to adjust the brightness of an image frame and a synthesized image frame by adjusting the quantity of reduction in brightness thereof, and to acquire the synthesized image frame by translucent synthesis. Still further, with respect to adjustment of the brightness of image frames of the first dynamic images, the quantity of reduction in brightness is adjusted so that the brightness becomes low whenever the next image frame is selected, and with respect to adjustment of the brightness of image frames of the second dynamic images, the quantity of reduction in brightness is adjusted so that the brightness becomes high whenever the next image frame is selected.

In order to achieve the abovementioned object, a computer-readable recording medium having a game program stored therein according to the invention is a recording medium, readable by a computer, in which a game program to achieve a process of displaying dynamic images on a screen is stored, wherein the computer causes the computer to execute programs of: displaying a first dynamic image depicted from the first viewpoint, which is composed of a plurality of image frames; when a viewpoint of a dynamic image to be displayed on a screen is changed, reciprocally adjusting the brightness of one image frame of the first dynamic images and the brightness of one image frame of the second dynamic images depicted from the second viewpoint, which is composed of a plurality of image frames, whenever the image frame to be displayed on a screen is renewed; acquiring a synthesized image frame by synthesizing the corresponding two image frames whose brightness has been adjusted; and displaying the corresponding synthesized image frame on a screen.

A recording medium, readable by a computer, having programs stored therein according to the invention stores the programs that execute: with respect to image frames of the first dynamic images, adjusting the brightness so that it gradually becomes low whenever the next image frame is selected; and, with respect to image frames of the second dynamic images, adjusting the brightness so that it becomes high when the next image frame is selected.

In order to achieve the abovementioned object, a game program according to the invention is a game program to achieve a process for displaying dynamic images on a screen, which causes a computer to process image display. When a viewpoint for a dynamic image to be displayed on a screen is changed, the computer translucently synthesizes a dynamic image depicted from a viewpoint before the viewpoint is changed, and a dynamic image depicted from a viewpoint after the viewpoint is changed, together frame by frame in respective images. When a viewpoint for a dynamic image to be displayed is changed, the computer fades out the image by gradually increasing transparency of the dynamic image depicted from a viewpoint before the viewpoint is changed, and at the same time, fades in the image by gradually reducing the transparency of the dynamic image depicted from a viewpoint after the viewpoint is changed.

In order to achieve the abovementioned object, a game program according to the invention is a game program to achieve a process for displaying dynamic images on a screen, which causes a computer to execute: displaying a first dynamic image depicted from a certain first viewpoint, which is composed of a plurality of image frames; when a viewpoint of a dynamic image to be displayed on a screen is changed, adjusting the brightness of one image frame of the first dynamic images and brightness of one image frame of the second dynamic images depicted from the second viewpoint, which consists of a plurality of image frames, acquiring a synthesized image frame by synthesizing the corresponding two image frames whose brightnesses were adjusted, and displaying the corresponding synthesized image frame on a screen; subsequently mutually selecting the brightness of the next image frame of the first dynamic images, and brightness of the next image frame of the second dynamic images whenever image frames to be displayed are renewed; and reciprocally adjusting the brightness of the synthesized image frame acquired by the last synthesis, and brightness of the reciprocally selected next image frame, acquiring a newly synthesized image frame by synthesizing the synthesized image frame whose brightness has been previously adjusted, and the image frame, and displaying the corresponding synthesized image frame on a screen.

The game program according to the invention causes a computer to adjust the brightness of an image frame and a synthesized image frame by adjusting the quantity of reduction in brightness thereof, and to acquire the synthesized image frame by translucent synthesis. Further, with respect to adjustment of the brightness of image frames of the first dynamic images, the game program causes a computer to adjust the quantity of reduction in brightness so that the brightness becomes low whenever the next image frame is selected, and with respect to adjustment of the brightness of image frames of the second dynamic images, the game program causes the computer to adjust the quantity of reduction in brightness so that the brightness becomes high whenever the next image frame is selected.

In order to achieve the object, a game program according to the invention is a game program to achieve a process for displaying dynamic images. A computer displays a first dynamic image depicted from the first viewpoint, which is composed of a plurality of image frames. When a viewpoint of a dynamic image to be displayed on a screen is changed, the computer reciprocally adjusts the brightness of one image frame of the first dynamic images and the brightness of one image frame of the second dynamic images depicted from the second viewpoint, which is composed of a plurality of image frames, whenever the image frame to be displayed on a screen is renewed. The computer also acquires a synthesized image frame by synthesizing the corresponding two image frames whose brightness has been adjusted; and displays the corresponding synthesized image frame on a screen.

In addition, the game program according to the invention causes a computer, with respect to image frames of the first dynamic images, to adjust the brightness so that it gradually becomes low whenever the next image frame is selected. With respect to image frames of the second dynamic images, the computer adjusts the brightness so that it gradually becomes high when the next image frame is selected.

In order to achieve the object, a method for processing a game, which achieves a game capable of displaying dynamic images on a screen according to the invention, includes when a viewpoint for a dynamic image to be displayed on the screen is changed, translucently synthesizing a dynamic image depicted from a viewpoint before the viewpoint is changed, and a dynamic image depicted from a viewpoint after the viewpoint is changed, together frame by frame in respective images. The method also includes, when a viewpoint for a dynamic image to be displayed on the screen is changed, fading out the image by gradually increasing transparency of the dynamic image depicted from a viewpoint before the viewpoint is changed, and at the same time, fading in the image by gradually reducing the transparency of the dynamic image depicted from a viewpoint after the viewpoint is changed.

In order to achieve the object, a method for processing a game, which achieves a game capable of displaying dynamic images according to the invention, includes displaying a first dynamic image depicted from a certain first viewpoint, which is composed of a plurality of image frames. When a viewpoint of a dynamic image to be displayed is changed, the method further includes reciprocally adjusting the brightness of one image frame of the first dynamic images and the brightness of one image frame of the second dynamic images depicted from the second viewpoint, which consists of a plurality of image frames, acquiring a synthesized image frame by synthesizing the corresponding two image frames whose brightnesses were adjusted; displaying the corresponding synthesized image frame; and subsequently mutually selecting the brightness of the next image frame of the first dynamic images, and brightness of the next image frame of the second dynamic images whenever image frames to be displayed are renewed; reciprocally adjusting the brightness of the synthesized image frame acquired by the last synthesis, and brightness of the reciprocally selected next image frame; acquiring a newly synthesized image frame by synthesizing the synthesized image frame whose brightness has been previously adjusted, and the image frame; and displaying the corresponding synthesized image frame on the screen.

Further, a method for processing a game according to the invention enables adjustment of the brightness of an image frame and a synthesized image frame by adjusting the quantity of reduction in brightness thereof; and acquisition of the synthesized image frame by translucent synthesis. Also, the method for processing a game enables, with respect to adjustment of the brightness of image frames of the first dynamic images, adjustment of the quantity of reduction in brightness so that the brightness becomes low whenever the next image frame is selected, and with respect to adjustment of the brightness of image frames of the second dynamic images, adjustment of the quantity of reduction in brightness so that the brightness becomes high whenever the next image frame is selected.

In order to achieve the object, a game processing method according to the invention is a method for processing a game, which achieves a game capable of displaying dynamic images on a screen, and enables display of a first dynamic image depicted from the first viewpoint, which is composed of a plurality of image frames; when a viewpoint of a dynamic image to be displayed is changed, reciprocal adjustment of the brightness of one image frame of the first dynamic images and the brightness of one image frame of the second dynamic images depicted from the second viewpoint, which is composed of a plurality of image frames, whenever the image frame to be displayed on the screen is renewed; acquisition of a synthesized image frame by synthesizing the corresponding two image frames whose brightness has been adjusted; and display of the corresponding synthesized image frame on the screen.

A game processing method according to the invention adjusts the brightness so that it gradually becomes low, whenever the next image frame is selected, with respect to image frames of the first dynamic images; and adjusts the brightness so that it gradually becomes high when the next image frame is selected, with respect to image frames of the second dynamic images.

In order to achieve the object, a game processing apparatus according to the invention is a game processing apparatus for achieving a game by displaying images on a screen, which comprises: a recording medium, readable by a computer, having a program stored therein to achieve a game; a computer for executing the program by reading at least one part of the program from the recording medium; and a display for displaying images of the game which is achieved by the program; wherein, by reading at least one part of the program from the recording medium, the computer is caused to: display dynamic images on the screen; when a viewpoint for a dynamic image to be displayed is changed, translucently synthesize a dynamic image depicted from a viewpoint before the viewpoint is changed, and a dynamic image depicted from a viewpoint after the viewpoint is changed, together frame by frame in respective images; and when a viewpoint for a dynamic image to be displayed on the screen is changed, fade out the image by gradually increasing transparency of the dynamic image depicted from a viewpoint before the viewpoint is changed, and at the same time, fade in the image by gradually reducing the transparency of the dynamic image depicted from a viewpoint after the viewpoint is changed.

In order to achieve the object, a game processing apparatus according to the invention is a game processing apparatus for achieving a game by displaying images on a screen, which comprises: a recording medium, readable by a computer, having a program stored therein to achieve a game; a computer for executing the program by reading at least one part of the program from the recording medium; and a display for displaying images of the game which is achieved by the program. By reading at least one part of the program from the recording medium, the computer is caused to display a first dynamic image depicted from a certain first viewpoint, which is composed of a plurality of image frames; when a viewpoint of a dynamic image to be displayed is changed, adjust brightness of one image frame of the first dynamic images and brightness of one image frame of the second dynamic images depicted from the second viewpoint, which consists of a plurality of image frames, acquire a synthesized image frame by synthesizing the corresponding two image frames whose brightnesses were adjusted, and display the corresponding synthesized image frame on the screen; subsequently mutually select the brightness of the next image frame of the first dynamic images, and brightness of the next image frame of the second dynamic images whenever image frames to be displayed on the screen are renewed; and reciprocally adjust the brightness of the synthesized image frame acquired by the last synthesis, and brightness of the reciprocally selected next image frame; acquire a newly synthesized image frame by synthesizing the synthesized image frame whose brightness has been previously adjusted, and the image frame; and display the corresponding synthesized image frame on the screen.

In order to achieve the object, a game processing apparatus according to the invention adjusts the brightness of an image frame and a synthesized image frame by adjusting the quantity of reduction in brightness thereof, and acquires the synthesized image frame by translucent synthesis. Still further, in the game processing apparatus, with respect to adjustment of the brightness of image frames of the first dynamic images, the quantity of reduction in brightness is adjusted so that the brightness becomes low whenever the next image frame is selected, and with respect to adjustment of the brightness of image frames of the second dynamic images, the quantity of reduction in brightness is adjusted so that the brightness becomes high whenever the next image frame is selected.

In order to achieve the object, a game processing apparatus according to the invention is a game processing apparatus for achieving a game by displaying images on a screen, which comprises: a recording medium, readable by a computer, having a program stored therein to achieve a game; a computer for executing the program by reading at least one part of the program from the recording medium; and a display for displaying images of the game which is achieved by the program; wherein, by reading at least one part of the program from the recording medium, the computer is caused to: display a first dynamic image depicted from the first viewpoint, which is composed of a plurality of image frames; when a viewpoint of a dynamic image to be displayed on the screen is changed, reciprocally adjust the brightness of one image frame of the first dynamic images and the brightness of one image frame of the second dynamic images depicted from the second viewpoint, which is composed of a plurality of image frames, whenever the image frame to be displayed on the screen is renewed; acquire a synthesized image frame by synthesizing the corresponding two image frames whose brightness has been adjusted; and display the corresponding synthesized image frame.

In a game processing apparatus according to the invention, the brightness of image frames of the first dynamic images is adjusted so that the brightness gradually becomes low whenever the next image frame is selected, and the brightness of image frames of the second dynamic images is adjusted so that the brightness gradually becomes high whenever the next image frame is selected.

As understood on the basis of the abovementioned description, according to the computer-readable recording medium in which the game programs are stored, game program, game processing method, and game processing apparatus of the invention, the brightnesses of the respective frames of dynamic images depicted from multiple viewpoints are adjusted and synthesized frame by frame. Therefore, even though a displayed character moves in real time, the fade-out of the screen depicted from the source viewpoint and fade-in of the screen depicted from the target viewpoint can be carried out, whereby both images depicted from at the source camera and those depicted from the target camera can be displayed on the screen in the form of natural numbers.

BRIEF DESCRIPTION OF THE DRAWINGS

FIG. 5 is an explanatory view showing a data configuration of a camera selection table used in the first embodiment of the invention;

FIG. 9 is an explanatory view showing changes in the transparency of the source image data and that of a target image data, in line with a frame transition, according to the first embodiment of the invention;

FIG. 16 is an explanatory view showing changes in a multiplication value of the source image data and a subtraction value of a target image data, in line with transitions of frames, according to the second embodiment of the invention;

DETAILED DESCRIPTION OF THE INVENTION

A detailed description is given of embodiments of the invention with reference to the accompanying drawings.

Embodiment 1

Figure 1:
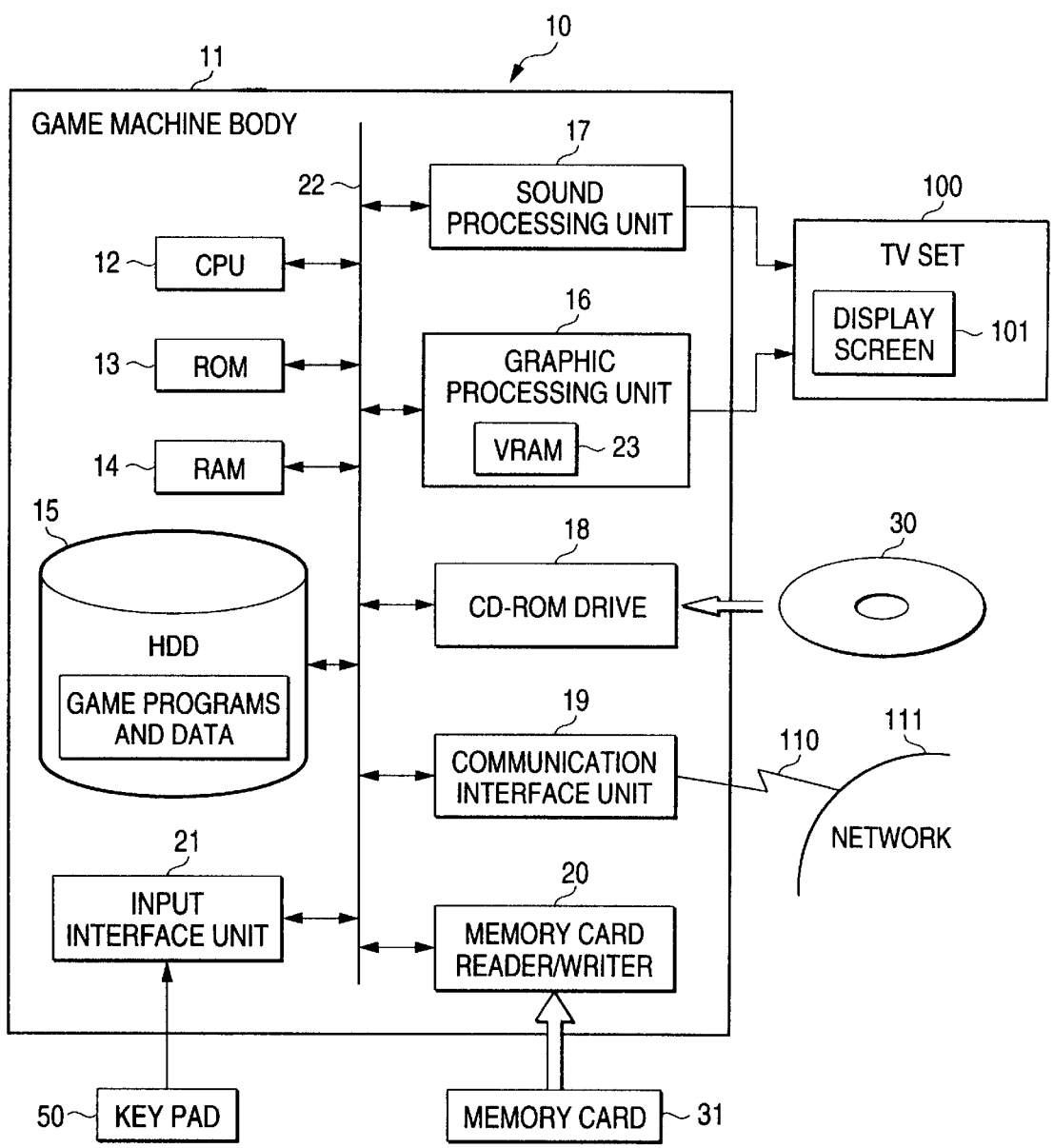
FIG. 1 is a block linear diagram showing one example of a video game apparatus according to the first embodiment of the invention.

First, a description is given of a first embodiment of the invention. FIG. 1 indicates a video game apparatus, as a game processing apparatus, according to one embodiment of the invention. The video game apparatus executes a program recorded in a computer-readable recording medium according to one embodiment of the invention, and is used for execution of a game processing method according to one embodiment of the invention.

A video game apparatus 10 is composed of, for example, a game machine body 11, and a key pad 50 connected to the input side of the game machine body 11, wherein a television (TV) set 100 has a CRT as a display monitor and a speaker connected to the output side of the video game apparatus 10. The keypad 50 is operated by a user (player) and provides the game machine body 11 with instructions given by the user. The television set 100 displays a picture (image) and outputs sound responsive to a game content on the basis of video signals (picture signals) and sound signals supplied by the game machine body 11.

The game machine body 11 has, for example, a CPU 12, ROM 13, RAM 14, hard disk drive (HDD) 15, graphics processing unit 16, sound processing unit 17, CD-ROM (Compact Disk Read Only Memory) drive 18, communications interface unit 19, memory card reader writer 20, input interface unit 21, and a bus 22 which connects these components to each other.

The CPU 12 carries out basic control of the entire system by executing an operation system stored in the ROM 13, and executes a game program stored in a program storing area, described later, of the RAM 14.

The RAM 14 stores game programming data and image data, etc., which the CR-ROM drive 18 reads from the CD-ROM 30, in respective areas. Also, the game programming data and image data can be stored in the hard disk drive 15.

Figure 2:
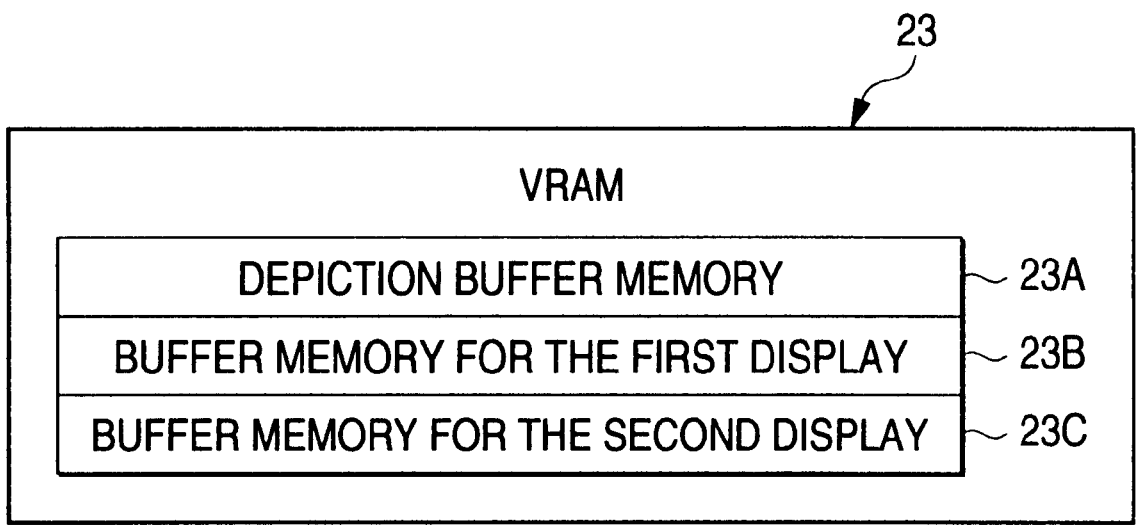
FIG. 2 is an explanatory view showing one example of the internal structure of a VRAM of the video game apparatus according to the first embodiment of the invention.

The graphics processing unit 16 has a VRAM 23. As shown in FIG. 2, the VRAM 23 contains a depiction buffer memory (virtual buffer) 23A, first display buffer memory (frame buffer) 23B, and second display buffer memory (frame buffer) 23C as buffer memories for storing image data. The graphics processing unit 16 generates video signals on the basis of the image data stored in the first display buffer memory 23B and second display buffer memory 23C in compliance with an instruction from the CPU 12 in line with execution of a program, and outputs the video signals to the television set 100, whereby a display image can be obtained on a display screen 101 of the television set 100 by image data stored in the frame buffers.

The sound-processing unit 17 has a function to generate sound signals such as background music (BGM), sound effects, etc., and the sound processing unit 17 generates sound signals on the basis of data stored in the RAM 14 by an instruction from the CPU 12 in line with the execution of programs, and outputs it to the television set 100.

Since a CD-ROM 30 that is a recording medium is detachably set in the CD-ROM drive 18, the CD-ROM drive 18 reads game programming data, image data, and sound data, which are stored in the CD-ROM 30.

The communications interface unit 19 is selectively connected to a network 111 by a communications line 110, and carries out data transmissions with other apparatuses.

The memory card reader writer 20 is set so that the memory card 31 can be detached, and holds or saves data such as interim game advancing data and game environment setting data, etc.

A computer-readable recording medium according to an embodiment of the invention is a recording medium, readable by a computer, in which a game program such as a wrestling game (fighting game) is recorded, and it is composed of a CD-ROM 30 and a hard disk drive 15.

By making a computer execute programs recorded in the recording medium, the computer is caused to carry out the following processes. That is, the computer selects a dynamic image from at least one viewpoint among dynamic images depicted from a plurality of different viewpoints (cameras) set in a virtual space, and achieves a process of displaying the dynamic image.

And, when the viewpoint of a dynamic image to be displayed is changed (that is, a camera is changed), the computer translucently synthesizes a dynamic image from a viewpoint before the change of the viewpoint and another dynamic image from another viewpoint after the change of the viewpoint together frame by frame. When the computer carries out the translucent synthesis, the computer fades out the image by gradually increasing transparency of the dynamic image depicted from a viewpoint before the viewpoint is changed, and at the same time, fades in the image by gradually reducing the transparency of the dynamic image depicted from a viewpoint after the viewpoint is changed. In the embodiment, a program to cause the game machine body 11 to execute the aforementioned process is stored in a CD-ROM, etc., which is a recording medium.

In further detail, by causing the computer to execute the program stored in the recording medium, the following process is carried out. That is, the computer generates a dynamic image (the first dynamic image) from at least one viewpoint, which is formed of a plurality of image frames, in real time, and displays it on a display screen.

When changing the viewpoint of a dynamic image to be displayed, the computer reciprocally adjusts brightness of one image frame of the first dynamic images and brightness of one image frame of another dynamic image (the second dynamic image) depicted from the second viewpoint, which consists of a plurality of image frames. And the computer acquires a synthesized image frame by synthesizing the corresponding two image frames whose brightnesses were adjusted, and displays the corresponding synthesized image frame.

Subsequently, the computer mutually selects the brightness of the next image frame of the first dynamic images, and brightness of the next image frame of the second dynamic images whenever image frames to be displayed are renewed; and reciprocally adjusts the brightness of the synthesized image frame acquired by the last synthesis, and brightness of the reciprocally selected next image frame, acquires a newly synthesized image frame by synthesizing said synthesized image frame whose brightness has been previously adjusted, and said image frame, and displays the corresponding synthesized image frame, whereby an imaging process of fade-out and fade-in among the respective dynamic images is executed in the game machine body 11.

In this case, the computer adjusts the brightnesses of the image frame and synthesized image frame by adjusting the quantity of reduction in the brightnesses in the image frame and synthesized image frame, and acquires the abovementioned synthesized image frame by translucent synthesis. For example, with respect to adjustment of the brightness of the image frame of the first dynamic image, the computer adjusts the quantity of reduction in the brightness so that the brightness becomes low whenever the next image frame is selected, and with respect to adjustment of the brightness of the image frame of the second dynamic image, the computer adjusts the quantity of reduction in the brightness so that the brightness becomes high whenever the next image frame is selected.

Next, a detailed description is given of actions of a video game apparatus 10 according to the embodiment. The CPU 12 reads programs and data necessary for execution of a game from the CD-ROM 30 via the CD-ROM drive 18 on the basis of the operating system stored in the ROM 13. The read data are transferred to the RAM 14 and hard disk drive 15.

And, since the CPU 12 executes a program transferred to the RAM 14, various types of processes, described later, to progress the game are executed in the video game apparatus 10. Also, there are some control actions to be executed in the video game apparatus 10, which make actual control by devices other than the CPU 12 cooperating with the CPU 12.

Programs and data necessary to execute the game are actually read from the CD-ROM 30 one after another on the basis of progression of the process in compliance with instructions from the CPU 12, and are transferred into the RAM 14. However, in the following description, to easily understand the invention, a detailed description regarding the reading of data from the CD-ROM 30 and transfer of the data into RAM 14 is omitted.

Figure 3:
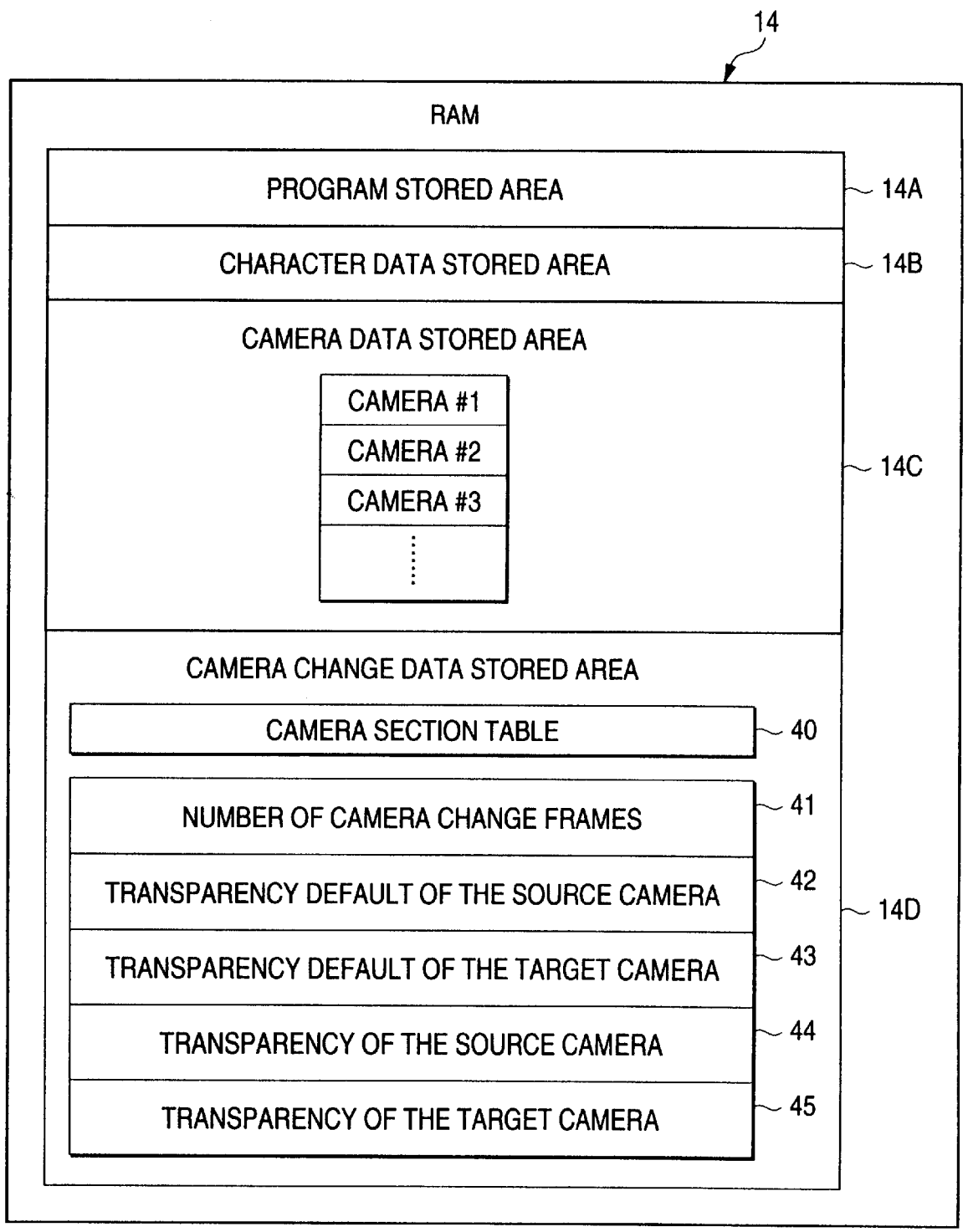
FIG. 3 is an explanatory view showing one example of the internal structure of a RAM of the video game apparatus according to the first embodiment of the invention.

Herein, a description is given of a configuration of the data stored in the RAM 14 during execution of a game program according to the embodiment. FIG. 3 is a view showing one example of the data configuration of RAM. The RAM 14 is, as shown in FIG. 3, provided with, for example, a program memory area 14A for storing game programs, a character memory area 14B that stores character data needed in the process of progression of a game program, a camera data memory area 14C that stores respective camera data of a plurality of cameras #1, #2, #3, Y, and a camera change data memory area 14D that stores data regarding the camera changes.

Figure 4:
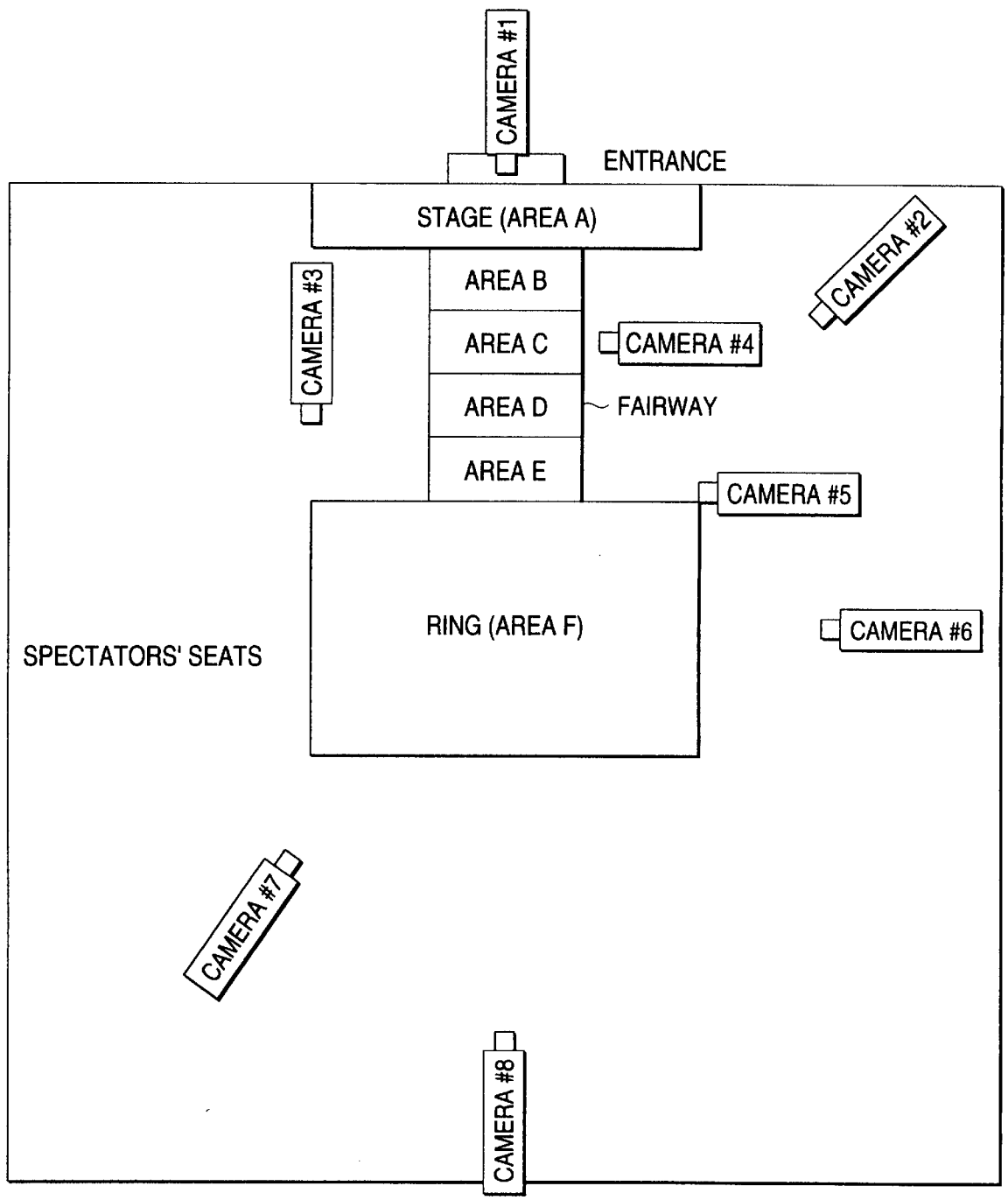
FIG. 4 is an explanatory view showing one example of a virtual three-dimensional space to be displayed on the screen in a game executed in the first embodiment of the invention.

In the first embodiment, the contents of the game is wrestling which is one of the fighting games. As shown in FIG. 4, a wrestling hall containing an entrance side stage (area A), fairways (areas B through E), ring (Area F), spectators=seats, and others constitutes a virtual three-dimensional space to be displayed on a display. Cameras #1, #2, #3, #4, #5, #6, #7, and #8 shoot the wrestling hall from different camera angles (viewpoints) for a live telecast.

In the camera data memory area 14C, data regarding respective movements of the cameras #1, #2, #3, #4, #5, #6, #7, and #8 are stored as separate data files of respective scenes camera by camera. The data regarding the movements of cameras are those related to the position and orientation, etc., of cameras per frame. When a camera is selected, an image that the selected camera shoots in the virtual three-dimensional space is depicted in real time. The depiction is carried out in, for example, a depiction buffer memory 23A.

The camera change data memory area 14D stores a camera selection table 40, number 41 of camera change frames, default 42 of the source camera transparency, default 43 of a target camera transparency, source camera transparency 44, and target camera transparency 45. The camera selection table 40 is a table that stores information describing the selection reference when changing a camera to display a game screen containing characters, etc. The number 41 of camera change frames stores the number of frames from commencement of a change to termination thereof when changing the camera. For example, a value such as, for example, 33 is preset.

In the source camera transparency default 42, a default of transparency of a camera (source camera) to fade out an image when changing the transparency of the camera is set in advance. In the target camera transparency default 43, a default of transparency of a camera (target camera) to fade in an image when changing the transparency of the camera is set in advance. In the source camera transparency 44, values showing the transparency of the source camera are stored frame by frame in an image. And in the target camera transparency 45, values showing the transparency of the target camera are stored frame by frame in an image.

Data of cameras #1, #2, #3, Y stored in the camera data memory area 14C are, for example, camera data to display characters moving by calculations of a computer. For example, they include a scene where a character such as a wrestler walks on a fairway and reaches the ring from a stage and a winning scene in the ring. In addition, camera data of a camera at the ringside are used to depict a character moving in response to an operation input. Cameras are selected on the basis of a probability in compliance with selection indexes defined in the camera selection table 40. Cameras are changed in compliance with display time elapses defined in the camera selection table 40. In other words, the viewpoint of a dynamic image to be displayed on a display is changed.

FIG. 5 is a view showing an example of a camera selection table according to the embodiment. The camera selection table 40 is structured so that it has a character position column 401 where an area where a character exists is divided into areas A, B, Y, a usable camera column 402 that defines a usable camera in the respective areas A, B, Y, a selection index column 403 that establishes selection indexes (probabilities) for the respective usable cameras, and a display time column 404 that shows a display time of the respective usable cameras.

The character position column 401 shows divisions of the respective areas where the wrestler can move. In the example shown in FIG. 5, for example, areas A, B, Y are set. In the usable camera column 402, the numbers of cameras usable in the areas corresponding to the areas where the wrestler can move are established. In the example shown in FIG. 5, cameras #1, #2, #3, Y are established, corresponding to the area A, and cameras #1, #4, #5, Y are established, corresponding to the area B.

Corresponding to the cameras usable in the respective areas, the selection indexes of the cameras are set in the selection index column 403. The selection indexes show a frequency at which the corresponding usable camera is selected. That is, a usable camera having a selection index of 20 is selected at a probability greater by two times than that of a camera having a selection index of 10. In the example of FIG. 5, for example, the selection index of camera #1 in the area A is 20, the selection index of camera #2 in the area A is 40, and the selection index of camera #3 of the area A is 30. In addition, the selection index of camera #1 in the area B is 10, the selection index of camera #4 in the area B is 60, and the selection index of camera #5 in the area B is 30.

In the display time column 404, the display time of the camera is set, corresponding to the usable cameras in the respective areas. The display time is set with a specified allowance. That is, the shortest time and longest time are set for the respective display times. Where a usable camera is selected as a target camera, any optional time between the shortest time and the longest time that are set as a display time is determined as the display time.

As shown in FIG. 5, in the display time column 404, for example, a value of 7 through 10 seconds (that is, 7 seconds or more and 10 seconds or less) is set, corresponding to the camera #1 in the area A, and a value of 7 through 9 seconds (7 seconds or more and 9 seconds or less) is set, corresponding to the camera #2 in the area A. A value of 3 through 5 seconds (3 seconds or more and 5 seconds or less) is set, corresponding to the camera #3 in the area A. A value of 5 through 6 seconds (5 seconds or more and 6 seconds or less) is set, corresponding to the camera #1 in the area B. A value of 4 through 8 seconds (4 seconds or more and 8 seconds or less) is set, corresponding to the camera #4 in the area B. And, a value of 4 through 8 seconds (4 seconds or more and 8 seconds or less) is set, corresponding to the camera #5 in the area B.

Figure 6:
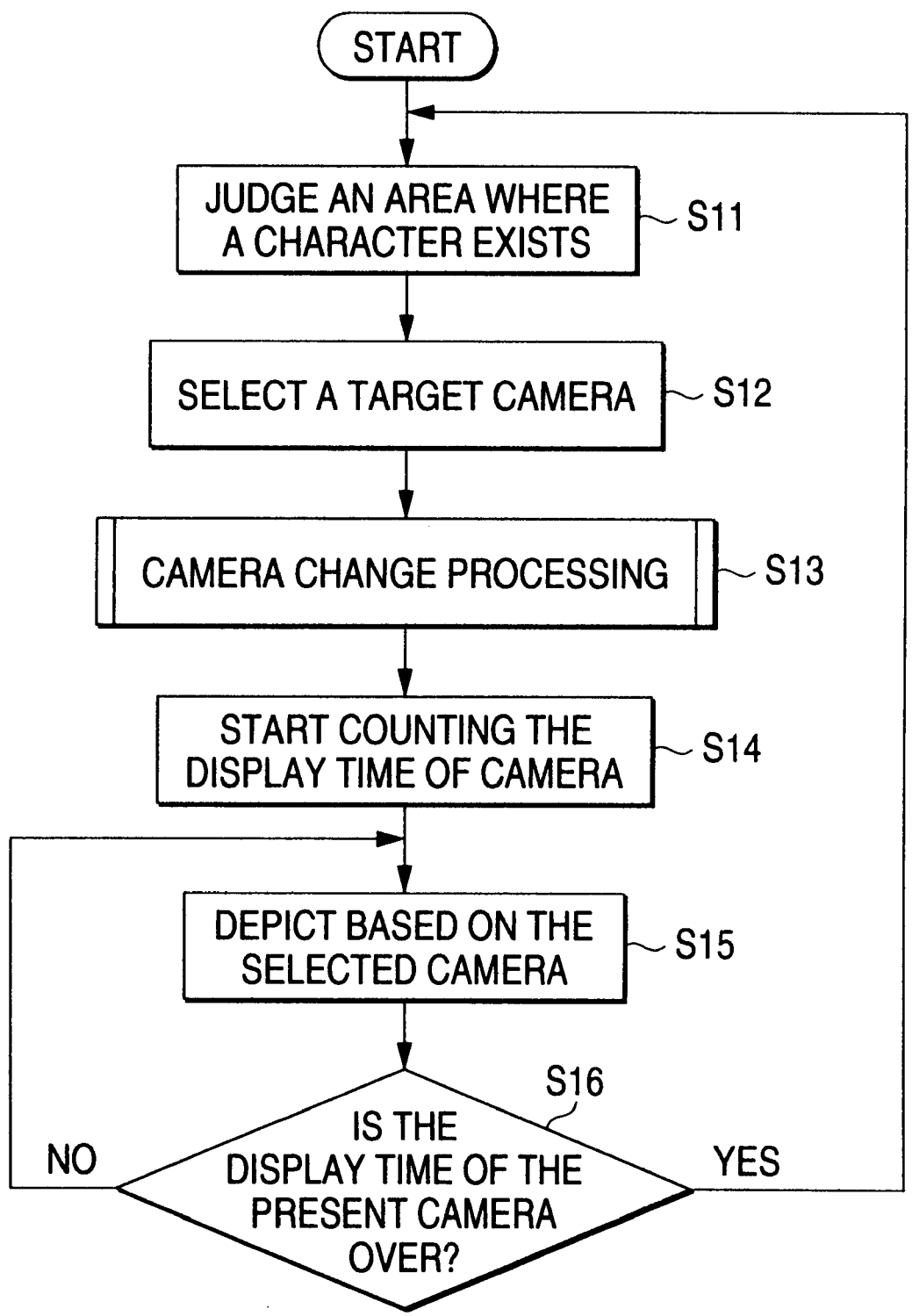
FIG. 6 is a flow chart of an image displaying process according to the first embodiment of the invention.
Figure 7:
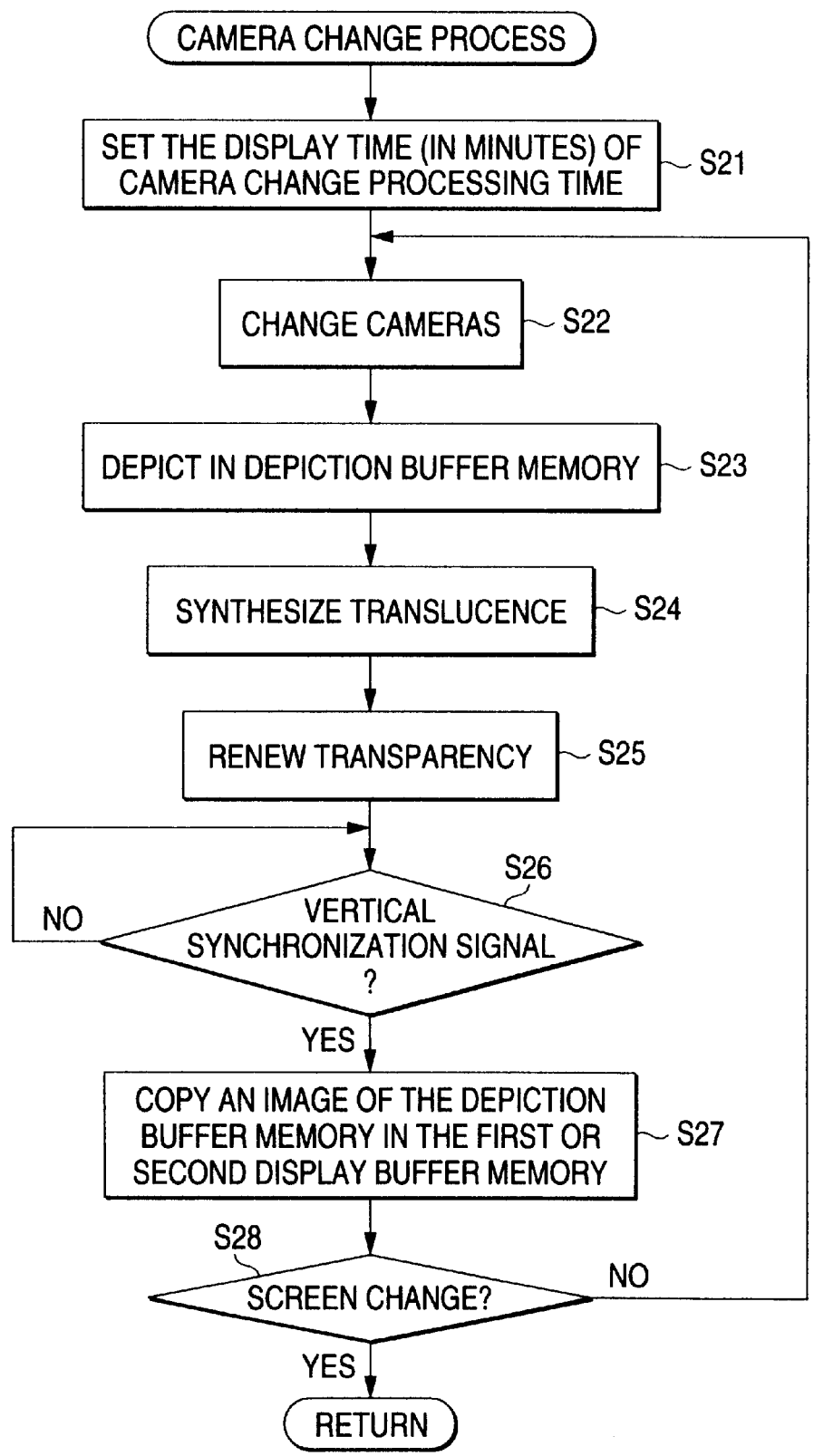
FIG. 7 is a flow chart showing a camera change process according to the first embodiment of the invention.

Next, using FIG. 6 and FIG. 7, a description is given of procedures of a display process according to the embodiment. FIG. 6 shows the routine of a display screen process in an automatic play that displays an appearance scene of a wrestler.

In the image display process, first, where characters exist is judged (Step S11). For example, it is judged to which areas among the respective areas A, B, C, D, E and F the position of a character in a virtual space of a game belongs.

Next, with reference to the data of the camera selection table 40 in compliance with an area where the character exists, a target camera (a dynamic image depicted from the viewpoint after the viewpoint is changed) is selected (Step S12). The target camera is selected among usable cameras corresponding to the area where the character exists. However, where the camera that is now used to display the current image is included in the usable cameras, the camera is excluded from the target cameras. Cameras to be selected are selected at a probability responsive to the selection index. That is, the probabilities at which the respective cameras are selected will become a value obtained by dividing the selection index of the camera by the total sum of the selection indexes of all the cameras to be selected.

Further, when the target camera is selected, the display time of the selected camera is also determined. The display time of the selected camera is determined with reference to the data of the display time column 404 of the camera selection table 40. That is, any optional time between the shortest time and the longest time, which are set by the display time of the selected camera, is determined.

Next, a camera change process is carried out (Step S13). The display time counting of the selected camera is commenced after the camera change process is completed (Step S14). And, a game image coming from the selected camera is depicted frame by frame, and is displayed on a display screen (Step S15).

Through a comparison between the display time determined simultaneously with the selection of the camera and the counted value of the display time, it is judged whether or not the display time of the current camera (selected camera) is finished (Step S16). That is, if the counted value of the display time exceeds the display time of the selected camera, it is judged that the display time is over.

If the display time is not finished (Step S16: NO route), the process returns to Step S15, wherein depiction (screen display) based on a dynamic image data by the selected camera is continued. To the contrary, if the display time is over (Step S16: YES route), the process returns to step S11, wherein the area where the character exists at present is judged. Hereinafter, processes from Step S12 through S16 are repeated.

Next, a detailed description is given of a camera change process. FIG. 7 is a flow chart that shows the details of the camera change process. As the camera change process is commenced, first, the display time equivalent to the camera change process is set (Step S21). That is, the time responsive to the number of camera change frames is set as a display time of the camera change process. For example, where the number of camera change frames is 33 and the display time per frame is 1/30 seconds, the display time will become 33/30 seconds.

Next, a camera change is carried out (Step S22), in which image data are written in the depiction buffer memory 23A. The camera change is reciprocally carried out between the source camera and the target cameras. And, a game image, coming from the camera, which is to be written in the image data is written (depicted) in the depiction buffer memory 23A (Step S23). Further, image data of the first or second display buffer memory 23B or 23C are translucently synthesized with the image data of the depiction buffer memory 23A (Step S24). Image data synthesized with the image data of the depiction buffer memory 23A are the image in the display buffer memory, which is an object of a screen output in the present frame.

Next, a transparency renewal process is executed (Step S25). By the transparency renewal process, the transparency of a synthesized image in the next synthesis is adjusted. By adjustment of the transparency, the quantity of reduction in brightness of the respective images is adjusted when translucently synthesizing by adjustment of the transparency. In the renewal process of the transparency in the first embodiment, for example, the transparency where depiction is executed by the source camera, and the transparency where depiction is executed by the target camera are renewed. However, since depiction of any one camera in the respective frame is carried out, the value of the transparency of the depicted image is used.

Further, depiction of images of the respective cameras is carried out with respect to the depiction buffer memory 23A, and the depiction buffer memory 23A is handled as a target of synthesis (that is, the side to be synthesized) when translucent synthesis is carried out. The transparency renewed in Step S25 is a transparency with respect to the images in the depiction buffer memory 23A. Generally, in the translucent synthesis, a transparency with respect to the images at the side to be synthesized is specified. In such cases, the transparency at the synthesizing side is specified so that the transparency of images in the depiction buffer memory 23A becomes a value set in Step S25.

Next, output of a vertical synchronization signal that is a transition trigger of an image display frame is monitored (Step S26). Until the vertical synchronization signal is issued (Step S26: NO route), monitoring regarding the output of the vertical synchronization signal is continued.

As the vertical synchronization signal is output (Step S26: YES route), the image data in the depiction buffer memory 23A are copied to the first or second display buffer memory 23B or 23C, wherein the copied image is displayed. That is, copying of the image data in the depiction buffer memory 23A is carried out from output of the vertical synchronization signal to commencement of output of the next frame image data into the television set 100.

And, whether or not a change of the display screen is completed is judged (Step S28). Whether or not a change of a display screen is finished is judged on the basis of whether or not the display time of the camera change process is finished. That is, if the display time of the camera change process is finished, it is judged that the change of the display screen has finished. If the display screen is changed (Step S28: YES route), the process advances to step S15 of a screen display process routine as shown in FIG. 6. Thereafter, an image coming from the target camera is displayed. To the contrary, if the display screen is not changed (Step S28: NO routine), the process returns to step S22, wherein the camera is changed, and the processes from step S23 through step S28 are repeated.

Figure 8:
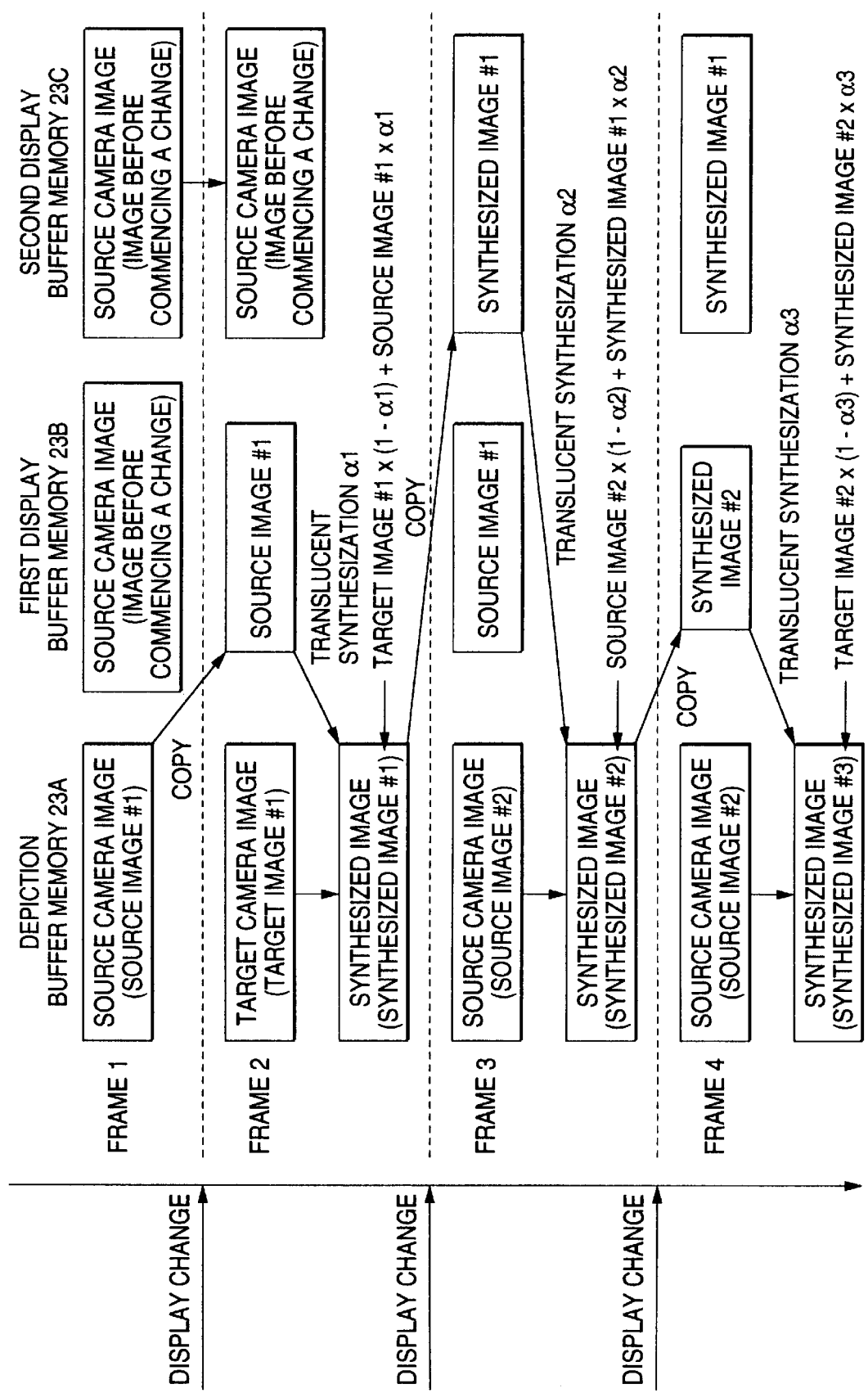
FIG. 8 is a transitional view of image data in a depiction buffer memory and display buffer memories in the camera change process according to the first embodiment of the invention.

Next, a description is given of a procedure of the camera change process described above, with reference to an image data transition view of the depiction buffer memory and display buffer memories, which are shown in FIG. 8. In the image data transition view, display is changed by a vertical synchronization signal, wherein frames are shifted in such a manner of frame 1→frame 2→frame 3 and →frame 4.

Frame 1:

Image data (source image #1) of the source camera, which are image data depicted from the last viewpoint, are written in the depiction buffer memory 23A. At this time, an image depending on the camera image data, before the change of the camera, which are set in the second display buffer memory 23C, is displayed on the screen.

Frame 2:

The source image #1 written in the depiction buffer memory 23A is copied onto the first display buffer memory 23B, and an image depending on the source image #1, which are set in the first display buffer memory 23B, is displayed on the screen.

Image data (the target image #1) of the target camera, which are image data depicted from a new viewpoint, are written in the depiction buffer memory 23A. And, the source image #1 set in the first display buffer memory 23B, which is displayed on the screen at present, is translucently synthesized with respect to the depiction buffer memory 23A. For example, the translucent synthesis is carried out at a transparency $a1$ close to the opaque, whereby a synthesized image #1 is generated.

The translucent synthesis is executed by a technique of alpha blending, etc. In the alpha blending, the degree of translucency of an image to be synthesized is designated in terms of value $a$. Real numbers 0 through 1 may be set as the value $a$. If the value $a$ is 0, the image to be synthesized is completely transparent, wherein even though a completely transparent image is synthesized, the target image does not change at all. Also, if the value $a$ is 1, the image to be synthesized is opaque. If an opaque image is synthesized, the target image is replaced by an image to be synthesized.

The degree of translucency indicates a quantity of reduction in brightness of an image to be synthesized. That is, if a translucent synthesis is carried out with a translucent value $a$, the value $a$ is multiplied by a value showing the brightness of the respective pixels of an image to be synthesized. Since the value $a$ is 1 or less, the brightness of the respective pixels is reduced. Also, the value showing the brightness of the respective pixels of an image being the target of synthesis is multiplied by a value of $(1-a)$, whereby the brightness of the target synthesizing image is reduced. And, by adding and synthesizing the image to be synthesized, whose brightness is reduced, with the target synthesizing image whose brightness is reduced, such a translucent synthesis is carried out. For example, in the frame 2, translucent synthesis is carried out at a degree of a target image #$1 \times (1-\alpha 1)$+source image data #$1 \times \alpha 1$. $\alpha 1$ indicating the transparency in the frame 2 is a value close to the opaque since the image to be synthesized is a source image (an image to be faded out).

Frame 3:

The image data (synthesized image #1) in the depiction buffer memory 23A after the translucent synthesis is copied into the second display buffer memory, wherein an image produced by the synthesized image #1 set in the second display buffer memory 23C is displayed on the screen. At this time, the displayed image becomes such that an image by the target image #1 is thinly (at a high transparency) overlapped on an image produced by a fresh source image #1.

The next camera image data (source image #2) at the source side are written in the depiction buffer memory 23A whose data has been cleared. And, the synthesized image #1 that is displayed on the screen at present and is set in the second display buffer memory 23C is translucently synthesized at a transparency a2 close to transparency, whereby the synthesized image data #2 are generated.

The translucent synthesis is carried out by a technique of alpha blending at a degree of the target image #2x(1−α2)+synthesized image #1xα2.

Frame 4:

The image data (synthesized image #2) in the depiction buffer memory 23A after the translucent synthesis is copied into the first display buffer memory 23B, wherein an image is displayed on the screen by using the synthesized image #2 set in the first display buffer memory 23B.

At this time, the display image becomes such that the image of the synthesized image #1 is translucently synthesized with the image of the source image #2. At this time, the transparency of the source image #2 is increased further than the transparency of the source image #1 in the synthesized image #1 in the frame 3.

Camera image data (target image #2) of the next frame at the target side is written in the depiction buffer memory 23A. And, the synthesized image #2 that is displayed on the screen at present and is set in the second display buffer memory 23C is translucently synthesized with the target image #2 in the depiction buffer memory 23A. At this time, the translucency a3 is a value closer to the transparency than a1 in the frame 2, whereby a synthesized image #3 is produced.

The translucent synthesis is carried out by a technique of alpha blending at a degree of the target image data #2x(1−a3)+synthesized image data#2xa3.

Hereinafter, until a change of the screen display occurs, the processes in the frames 3 and 4 described above are repeatedly performed. However, in translucent synthesis of odd-numbered frames (in which the image of the source camera is depicted in the depiction buffer), the transparency gradually becomes opaque whenever the display is changed (the transparency of the depicted image gradually becomes transparent). In addition, in the translucent synthesis of even-numbered frames (the image of the target camera is depicted in the depiction buffer memory), the transparency gradually becomes more transparent whenever the display is changed (the transparency of the depicted image gradually becomes opaque).

FIG. 9 shows an example of changes in the transparencies of the source image data and of the target image data. In FIG. 9, an example of transition of the transparencies is the illustrated embodiment. In the drawing, corresponding to the frame numbers, the transparency of the image written in the depiction buffer memory in the frame is illustrated. In the example shown in FIG. 9, values from 0 through 1 are converted to values 0 through 128. That is, values obtained by dividing the values shown in FIG. 9 by 128 will become the transparencies.

For example, as shown in FIG. 9, values showing the transparencies where the source image is depicted will, respectively, become values of 128, 126, 124, 122, 120, YY 66, and 64 in frames #1, #2, #3, #4, #5, . . . #32, and #33. In addition, values showing the transparencies where the source image is depicted will, respectively, become values of 64, 66, 68, 70, 72, . . . 126, and 128 in frames #1, #2, #3, #4, #5, #32, and #33.

When carrying out translucent synthesis in the respective frames, either of the transparency of the source image in FIG. 9 or the transparency of the target image therein may be applicable in response to the image data depicted in the depiction buffer memory 23A. That is, if the image data depicted in the depiction buffer memory 23A is the image of the target camera, translucent synthesis is carried out so that the transparency of the depicted image becomes a value expressed in terms of the transparency of the source image corresponding to the frame number. In the present embodiment, the depicted image becomes a target synthesizing image. Also, the transparency in the translucent synthesis is designated with transparency at the synthesizing side. Therefore, the value obtained by subtracting the transparency shown in FIG. 9 (the value obtained by dividing the value shown in FIG. 9 by 128) from 1 becomes a transparency in the translucent synthesis.

Figure 10:
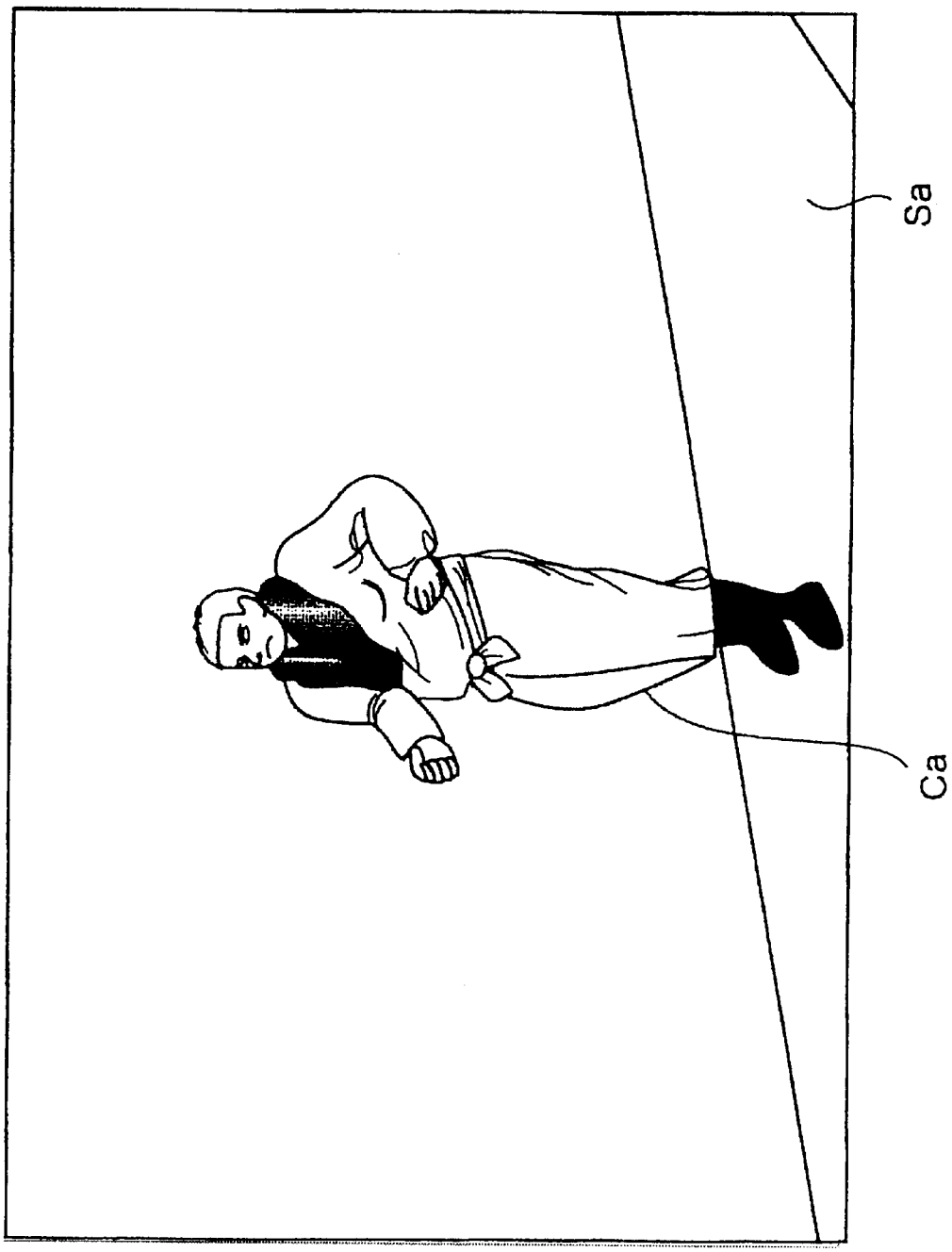
FIG. 10 is an explanatory view showing a screen display example in the first embodiment of the invention.

FIG. 10, FIG. 11, FIG. 12, FIG. 13 and FIG. 14, respectively, shows examples of transition of the display image by the image display processes described above. FIG. 10 shows a display image immediately before changing the camera. In this image, only a fairway Sa and a character Ca walking on the fairway Sa, which are image data picked by the source camera, are clearly displayed.

Figure 11:
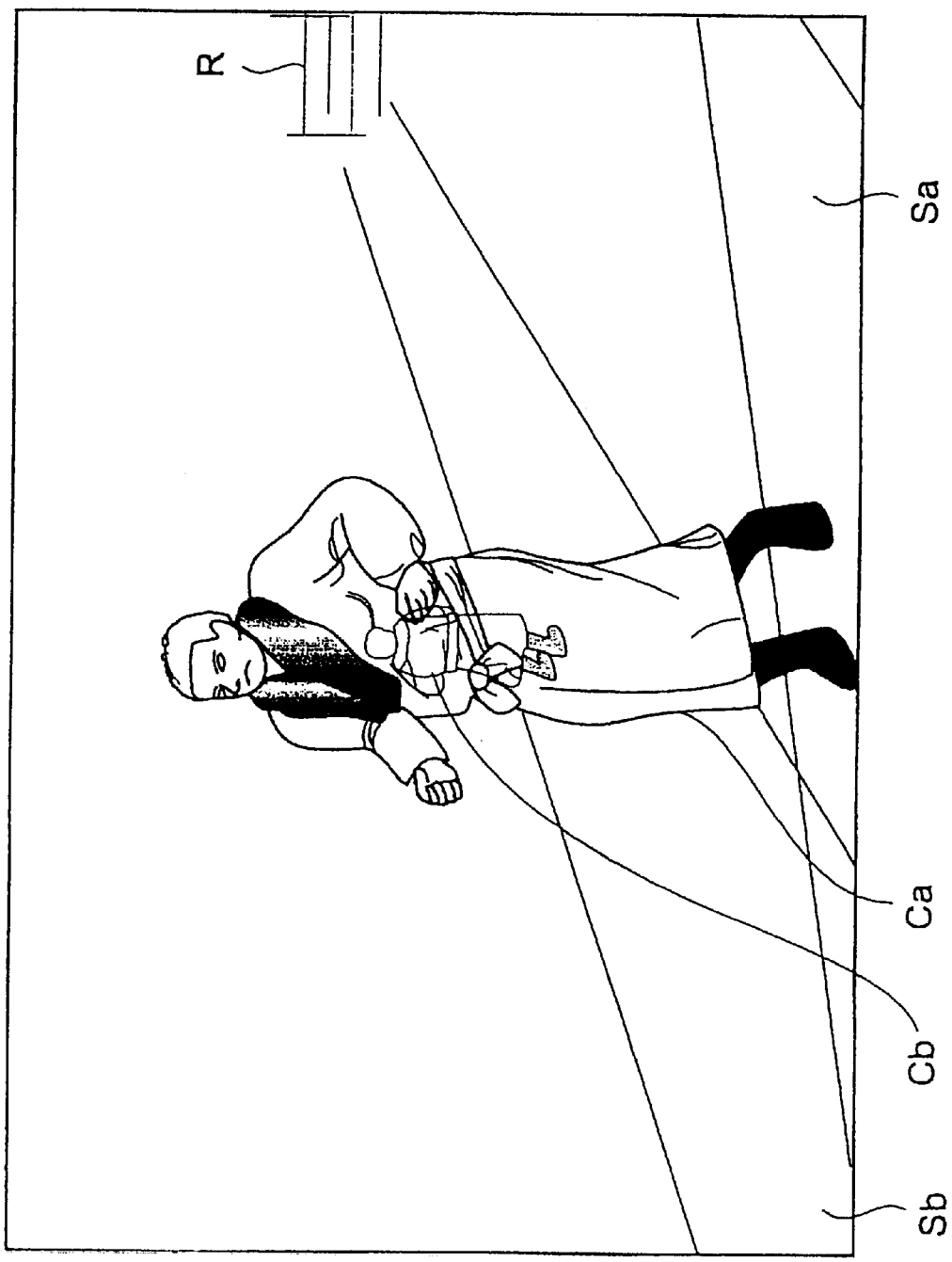
FIG. 11 is an explanatory view showing a screen display example in the first embodiment of the invention.

FIG. 11 shows an image immediately after the camera is changed. In this image, a fairway Sa and a character Ca walking thereon, based on the image data depicted from the source camera, are comparatively clearly displayed. Also, a fairway Sb, a character Cb walking on the fairway Sb, and a ring R slightly frontward thereof, based on the image data depicted from the target camera, are thinly displayed at a high transparency.

Figure 12:
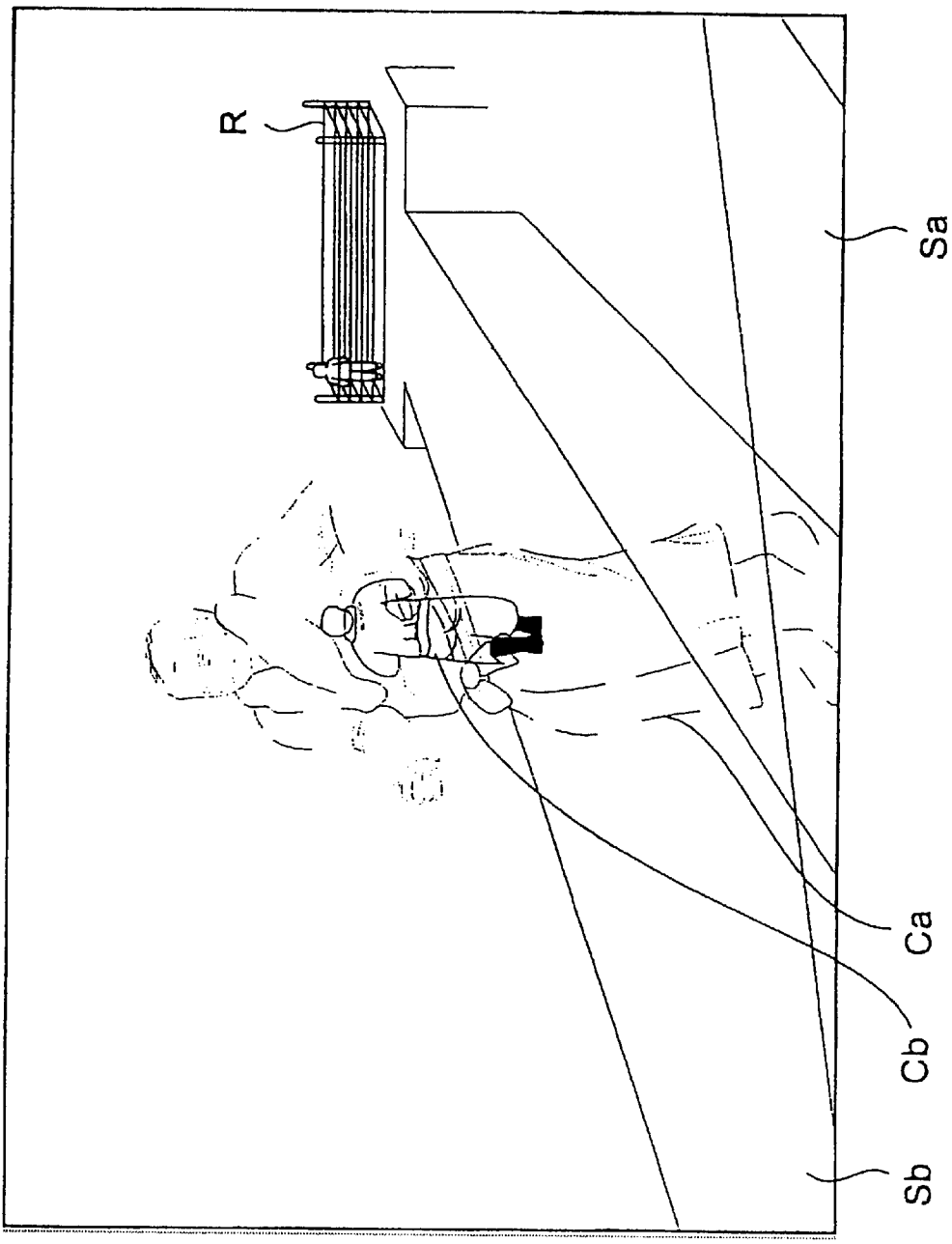
FIG. 12 is an explanatory view showing a screen display example in the first embodiment of the invention.

FIG. 12 shows an image appearing at the intermediate point during changing the cameras. In this image, the fairway Sa and character Ca walking on the fairway Sa, based on the image data depicted from the source camera, and the fairway Sb, character Cb walking on the fairway Sb, and ring R slightly frontward thereof, based on the image data depicted from the target camera, are displayed at the same transparency.

Figure 13:
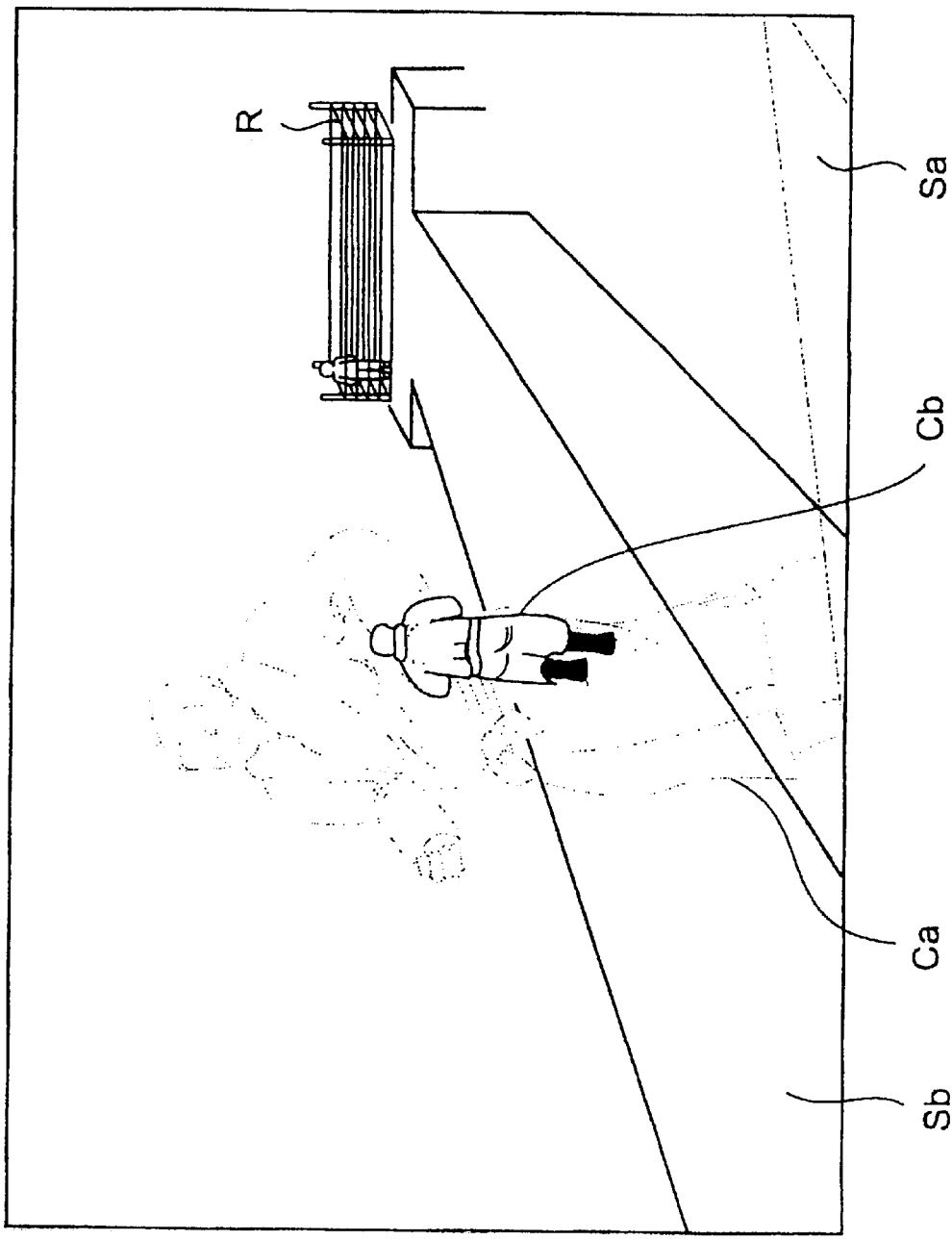
FIG. 13 is an explanatory view showing a screen display example in the first embodiment of the invention.

FIG. 13 shows an image immediately before termination of changing the cameras. In this image, reversing the state appearing immediately after changing the camera, the fairway Sa and character Ca walking on the fairway Sa, which are image data depicted from the source camera, are thinly displayed at a high transparency. In addition, the fairway Sb, character Cb walking on the fairway Sb, and ring R slightly frontward thereof, which are image data depicted from the target camera, are comparatively clearly displayed.

Figure 14:
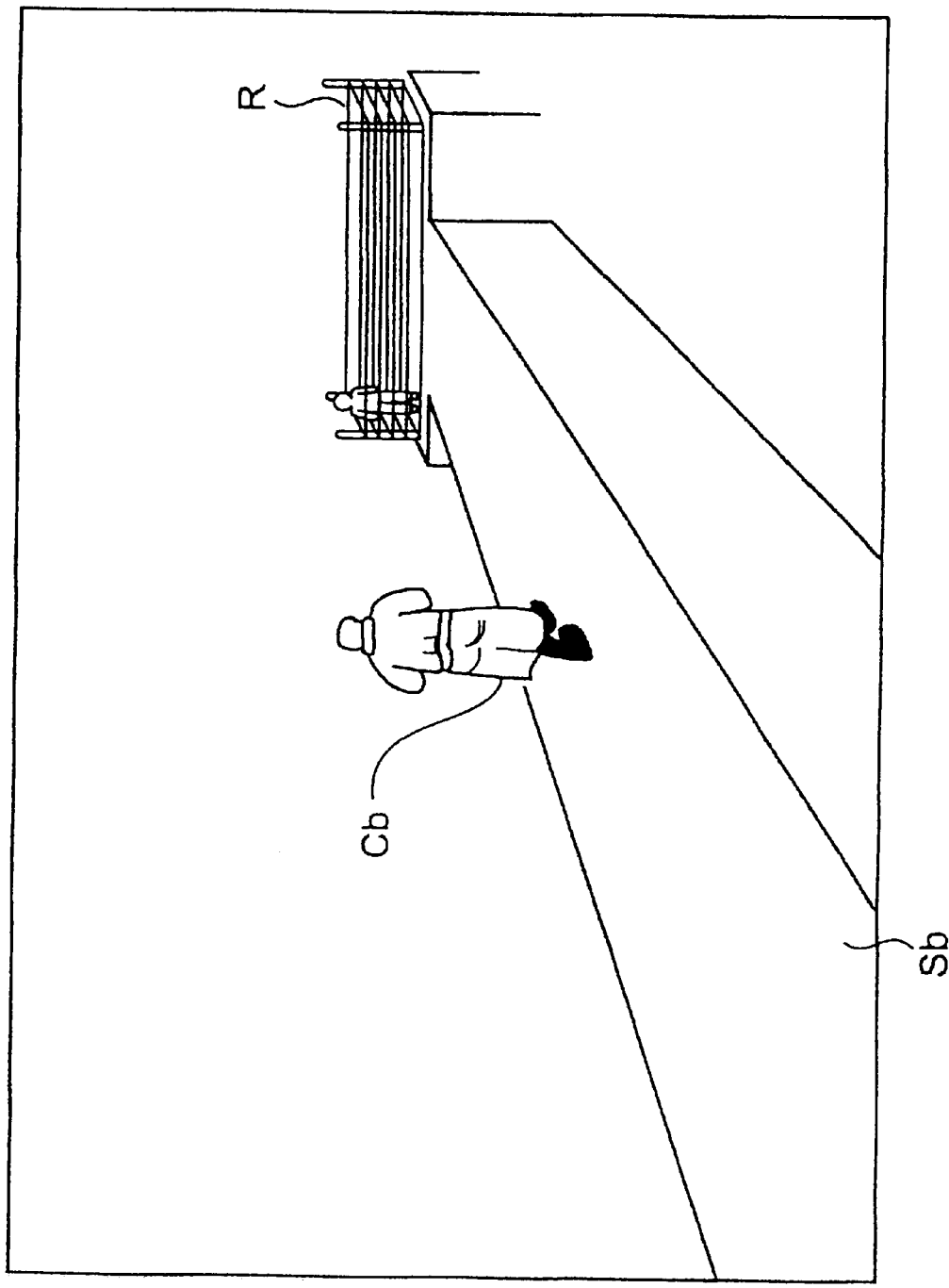
FIG. 14 is an explanatory view showing a screen display example in the first embodiment of the invention.

FIG. 14 shows an image immediately before changing the camera. In this image, only the fairway Sb, character Cb walking on the fairway Sb, and ring R slightly frontward thereof are clearly displayed.

Through the screen display processes described above, even though, a displayed character moves in real time like a wrestler walking on a fairway toward the ring, fade-out of the image depicted from the source viewpoint and fade-in of the image depicted from the target viewpoint can be carried out with natural images at both the source and target screens. Still further, by using the last translucent synthesis image for the next translucent synthesis, the remaining image effect can be obtained.

Embodiment 2

Next, a description is given of the second embodiment. In the first embodiment, although the fade-out and fade-in are processed while acquiring the remaining image effect, the fade-out and fade-in are carried out without acquiring any remaining image effect in the second embodiment. A program to execute the second embodiment is stored in a computer-readable recording medium. By executing the program stored in the recording medium in a computer of a video game apparatus, etc., illustrated in FIG. 1, the processes of the second embodiment can be carried out.

That is, by causing the computer to execute the program of the second embodiment, the computer executes the following processes. First, the first dynamic image, depicted from the first viewpoint, consisting of multiple image frames is displayed on a screen. And, where a viewpoint of the dynamic image to be displayed on the screen is changed, the brightness of one image frame of the first dynamic image, and the brightness of one image frame of the second dynamic image which is formed of a plurality of image frames and depicted from the second viewpoint are reciprocally adjusted. The corresponding two image frames whose brightnesses were adjusted are synthesized to acquire the synthesized image frame. Further, the acquired synthesized image frame is displayed on the screen.

In this case, the brightness of image frames of the first dynamic image is adjusted so that the brightness thereof gradually becomes low whenever the next image frame is selected. Also, the brightness of image frames of the second dynamic image is adjusted so that the brightness thereof gradually becomes high whenever the next image frame is selected.

In the second embodiment, only the camera change process is different from the first embodiment. Hereinafter, a description is given of the camera change process in the second embodiment.

Figure 15:
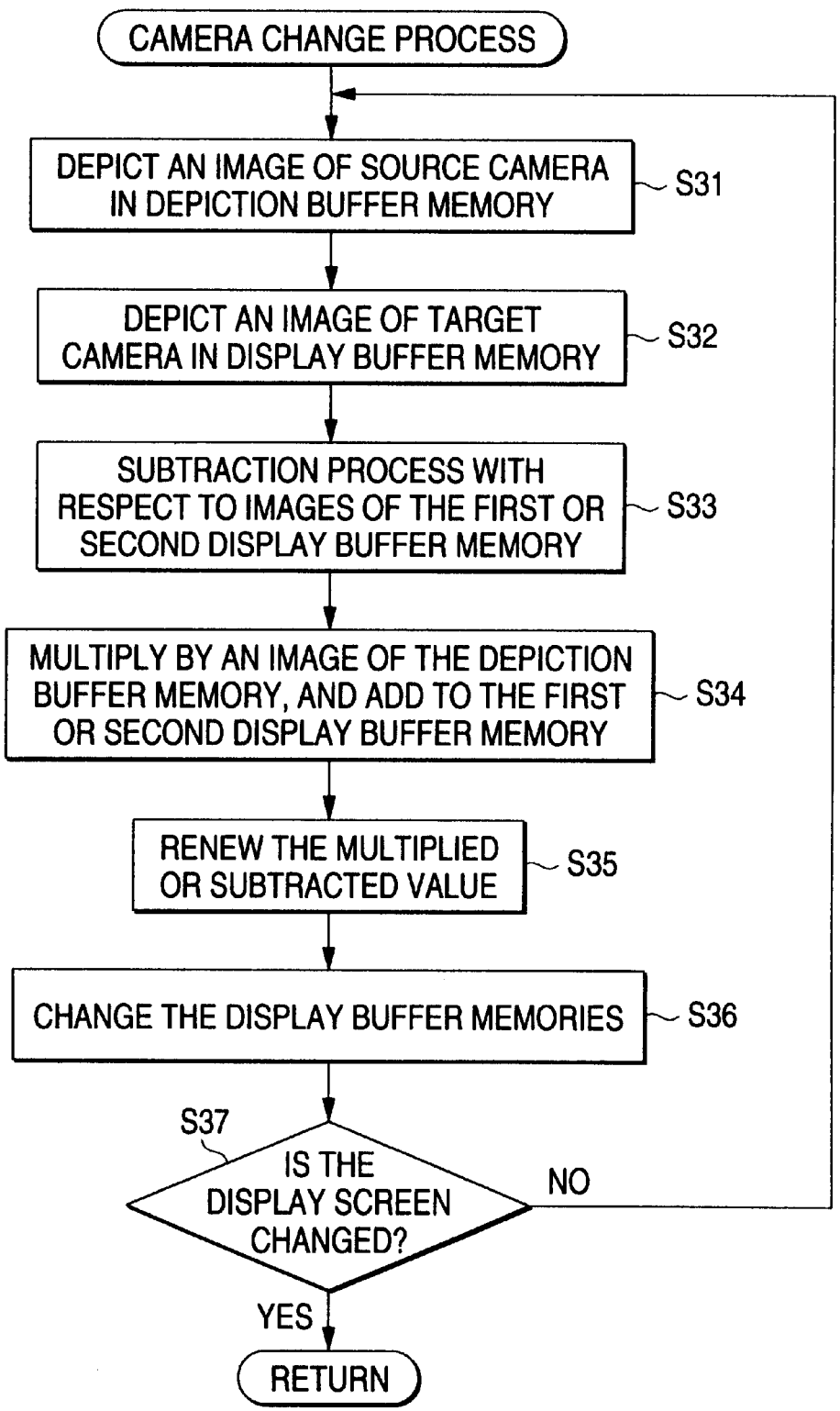
FIG. 15 is a view showing a flow chart of a camera change process according to the second embodiment of the invention.

FIG. 15 shows a routine of a camera change process in the second embodiment. First, the image data of the source camera are written in the depiction buffer memory 23A (Step S31). Next, the image data of the target camera are written in the first or second display buffer memories 23B or 23C (Step S32).

Next, a subtraction process is carried out, using an appointed subtraction value, with respect to the brightnesses of the respective pixels of the image data depicted from the target camera in the first or second buffer memory 23B or 23C (Step S33). Subsequently, a multiplication process is carried out, using an appointed multiplication value, with respect to the brightnesses of the respective pixels of the image data picked by the source camera in the depiction buffer memory 23A. The result (the multiplied value) is added to the image data, depicted from the target camera of the first or second buffer memory 23B or 23C, which has already subtracted (Step S34).

Next, the multiplied value and subtracted value are renewed by values determined by the expression equations shown in FIG. 16 (Step S35). In FIG. 16, multiplied values of the source images and subtracted values of the target images in the respective frames are shown, corresponding to the frame numbers. The example shown in FIG. 16 shows a case where an image is changed at N frames (N: natural numbers).

For example, the default of the multiplied value is 1.0, and it is reduced by 1/(N−1) per transition of frames. In the final frame of a camera change, the multiplied value becomes 0. In addition, the default of the subtracted value is 255 which is reduced by 255/(N−1) per transition of frames, and in the final frame of a camera change, it becomes 0. Further, the subtracted value is an example where the maximum value in the brightnesses of the respective pixels is 255. This indicates that the image data depicted from the source camera become null and void in the final frame of the camera change, and only the image data depicted from the target camera becomes completely effective.

Next, the display buffer is changed. In line therewith, the screen display is renewed (Step S36). And, whether or not the screen change is completed is judged (Step S37). If processes are carried out equivalent to the number of frames of the screen change after the camera change process is commenced, it is judged that the screen change has been completed. If the screen change is not terminated, the process returns to step S31 (Step S37: NO route), wherein steps S31 through S37 are repeated. To the contrary, if the screen change is terminated, the process advances to (Step S37: YES route), wherein the process returns to Step S15 of the image display process routine shown in FIG. 6.

Figure 17:
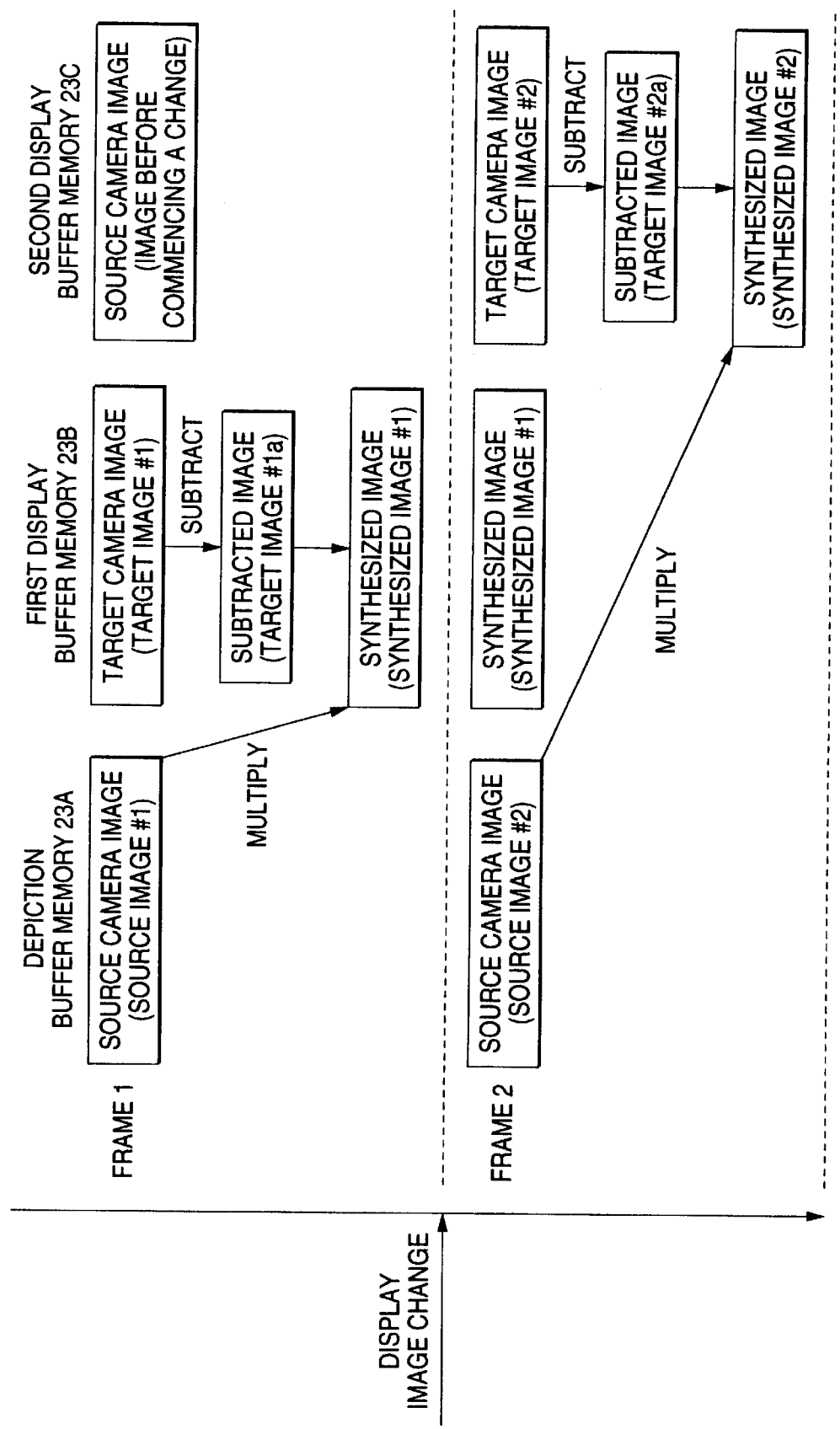
FIG. 17 is a transitional view of image data in a depiction buffer memory and display buffer memories in the camera change process according to the second embodiment of the invention.

Next, a description is given of a procedure of the camera change process described above, with reference to image data transition view, shown in FIG. 17, of the depiction buffer memory 23A, and the first and second buffer memories 23B and 23C. In the image data transition view, a display change is carried out by a vertical synchronization signal, wherein the frames are changed like frame 17 frame 2.

Frame 1

The image data (source image #1) depicted from the source camera, which are the image data depicted from the last viewpoint, are written in the depiction buffer memory 23A, and the image data (target image #1) depicted from the target camera, which are image data depicted from the new viewpoint, are written in the first display buffer memory 23B.

And, brightness is subtracted by an appointed subtraction value (default) with respect to the target image #1 of the first display buffer memory 23B, whereby subtracted image data of the target image #1 can be obtained in the first display buffer memory 23B. And, multiplication is carried out with an appointed multiplication value (default) with respect to the source image #1 of the depiction buffer memory 23A, wherein the image data are added to and synthesized with the first display buffer memory 23B. Thereby, synthesized image data of the target image #1 and source image #1 can be acquired. Thus, the image is displayed on the screen based on the synthesized image data.

Frame 2:

The next image data (source image #2) picked by the source camera are written in the depiction buffer memory 23A, and the next image data (target image #2) depicted from the target camera are written in the second display buffer memory.

And, a subtraction process is carried out with the renewed subtraction value with respect to the target image #2 in the second display buffer memory 23C, and new subtracted image data of the target image #2 can be obtained in the second display buffer memory 23C. Subsequently, a multiplication process is carried out with the renewed multiplication value with respect to the source image #2 of the depiction buffer memory 23A, and the image data are overwritten in the second display buffer memory 23C, whereby synthesized image data of the target image #2 and source image #2 are acquired, and the image is displayed on the screen on the basis of the synthesized image data.

Hereinafter, processes in the frames 1 and 2 described above are reciprocally carried out until the change of the screen display occurs. However, the subtraction value and multiplication value of the brightness are gradually reduced with such properties as illustrated in FIG. 16 whenever a display change is executed. By gradually reducing the subtraction value in the brightness of the image depicted from the target camera, a dynamic image depicted from the target camera can be faded in. In addition, by gradually reducing the brightness of the image depicted from the source camera, the dynamic image depicted from the source camera can be faded out.

Therefore, in the embodiment, even though a displayed character moves in real time, the fade-out of a screen based on the viewpoint at the source side and fade-in of an image based on the viewpoint at the target side can be carried out by the abovementioned screen display process, wherein both images at the source side and at the target side can be displayed naturally.

The screen display process described above is applicable to fade-out and fade-in of screens, when changing the cameras and scenes, in the screen display of characters operated by a player, other than automatic playing screens.

The game processing method described in the abovementioned embodiment can be achieved by executing programs prepared in advance, using a personal computer or a video game apparatus. The game program is recorded or stored in a computer-readable recording medium such as a hard disk, floppy disk, CD-ROM, (Magneto-optical disk) MO, DVD, etc., and is executed by the computer reading out the same. Also, the game program can be distributed via a network such as the Internet by means of the abovementioned recording medium.

What is claimed is:

1. A recording medium, readable by a computer, in which a game program to execute a process of displaying dynamic images on a screen is stored, the program causing said computer to process image display, wherein when an actual viewpoint for a dynamic image to be displayed is changed, said computer translucently synthesizes a source dynamic image depicted from a first viewpoint before the actual viewpoint is changed, and a target dynamic image depicted from a second viewpoint after the actual viewpoint is changed, together frame by frame in respective images, the synthesizing comprising fading out the source dynamic image by gradually increasing transparency of the source dynamic image and simultaneously fading the target dynamic image by gradually reducing the transparency of the target dynamic image.

2. A recording medium, readable by a computer, in which a game program to execute a process of displaying dynamic images on a screen is stored, and causing said computer to execute programs comprising:
    displaying a first dynamic image depicted from a first viewpoint, comprising a plurality of image frames;
    when an actual viewpoint of an actual dynamic image to be displayed is changed, reciprocally adjusting brightness of one image frame of the first dynamic image and brightness of one image frame of a second dynamic image depicted from a second viewpoint, comprising a plurality of image frames,
    synthesizing the corresponding two image frames whose brightnesses were adjusted,
    displaying the corresponding synthesized image frame;
    subsequently mutually selecting the brightness of the next image frame of said first dynamic image, and brightness of the next image frame of said second dynamic image whenever image frames to be displayed are renewed;
    reciprocally adjusting the brightness of the synthesized image frame, and brightness of the reciprocally selected next image frame;
    synthesizing said synthesized image frame whose brightness has been previously adjusted, and said image frame; and
    displaying the synthesized image frame.

3. The recording medium readable by a computer, in which programs are stored, as set forth in claim 2, wherein said programs cause said computer to adjust the brightness of an image frame and a synthesized image frame by adjusting the quantity of reduction in brightness thereof, and to acquire said synthesized image frame by translucent synthesis.

4. The recording medium readable by a computer, in which programs are stored, as set forth in claim 3, wherein the adjustment of the brightness of image frames of said first dynamic image further comprises adjusting the quantity of reduction in brightness so that the brightness becomes low whenever the next image frame is selected, and the adjustment of the brightness of image frames of said second dynamic image further comprises adjusting the quantity of reduction in brightness so that the brightness becomes high whenever the next image frame is selected.

5. A recording medium, readable by a computer, in which a game program to execute a process of displaying dynamic images on a screen is stored, and causing said computer to execute a program comprising:
    displaying a first dynamic image depicted from a first viewpoint, comprising a plurality of image frames;
    when a viewpoint of an actual dynamic image to be displayed is changed:
        reciprocally adjusting a brightness of one image frame of said first dynamic image and a brightness of one image frame of the second dynamic image depicted from a second viewpoint, which is composed of a plurality of image frames, whenever the image frame to be displayed is renewed;
        acquiring a synthesized image frame by synthesizing the corresponding two image frames whose brightness have been adjusted; and
        displaying the corresponding synthesized image frame.

6. The recording medium readable by a computer, as set forth in claim 5, having programs stored therein, wherein said programs execute:
    with respect to image frames of said first dynamic image, adjusting the brightness so that the brightness gradually becomes low whenever a next image frame is selected; and
    with respect to image frames of said second dynamic image, adjusting the brightness so that the brightness becomes high when a next image frame is selected.

7. A game program to display dynamic images, the program controlling a computer to process image display, wherein:
    when an actual viewpoint for a dynamic image to be displayed is changed, said computer translucently synthesizes a source dynamic image depicted from a first viewpoint before the actual viewpoint is changed, and a target dynamic image depicted from a second viewpoint after the actual viewpoint is changed, together frame by frame in respective images, the synthesizing comprising fading out the source dynamic image by gradually increasing transparency of the source dynamic image, and at the same time, fading in the target dynamic image by gradually reducing the transparency of the target dynamic image.

8. A game program to execute a process for displaying dynamic images, the program controlling a computer to process:

displaying a first dynamic image depicted from a first viewpoint, comprising a plurality of image frames;

when an actual viewpoint of an actual dynamic image to be displayed is changed, reciprocally adjusting a brightness of one image frame of said first dynamic image and a brightness of one image frame of a second dynamic image depicted from a second viewpoint, comprising a plurality of image frames;

acquiring a synthesized image frame by synthesizing the corresponding two image frames whose brightnesses were adjusted, and displaying the corresponding synthesized image frame;

subsequently mutually selecting the brightness of the next image frame of said first dynamic image, and brightness of the next image frame of said second dynamic image whenever image frames to be displayed are renewed; and reciprocally adjusting the brightness of the synthesized image frame acquired by the last synthesis, and brightness of the reciprocally selected next image frame;

acquiring a newly synthesized image frame by synthesizing said synthesized image frame whose brightness has been previously adjusted, and said image frame, and displaying the corresponding synthesized image frame.

9. The game program as set forth in claim 8, wherein the computer adjusts the brightness of an image frame and a synthesized image frame by adjusting the quantity of reduction in brightness thereof, and acquires said synthesized image frame by translucent synthesis.

10. The game program as set forth in claim 9, wherein, with respect to adjustment of the brightness of image frames of said first dynamic image, the computer adjusts the quantity of reduction in brightness so that the brightness becomes low whenever the next image frame is selected, and with respect to adjustment of the brightness of image frames of said second dynamic image, said computer adjusts the quantity of reduction in brightness so that the brightness becomes high whenever the next image frame is selected.

11. A game program to execute a process for displaying dynamic images, the program controlling a computer to execute:

displaying a first dynamic image depicted from a first viewpoint, comprising a plurality of image frames;

when a viewpoint of an actual dynamic image to be displayed is changed:

reciprocally adjusting a brightness of one image frame of said first dynamic image and a brightness of one image frame of a second dynamic image depicted from a second viewpoint, comprising a plurality of image frames, whenever the image frame to be displayed is renewed;

acquiring a synthesized image frame by synthesizing the corresponding two image frames whose brightness has been adjusted; and displaying the corresponding synthesized image frame.

12. The game program as set forth in claim 11, wherein the computer executes:

with respect to image frames of said first dynamic images, adjusting the brightness so that the brightness gradually becomes low whenever a next image frame is selected; and with respect to image frames of said second dynamic images, adjusting the brightness so that the brightness gradually becomes high when a next image frame is selected.

13. A method for processing a game displaying dynamic images when an actual viewpoint for a dynamic image to be displayed is changed, comprising:

translucently synthesizing a source dynamic image depicted from a first viewpoint before the actual viewpoint is changed, and a target dynamic image depicted from a second viewpoint after the actual viewpoint is changed, together frame by frame in respective images; and fading out the source dynamic image by gradually increasing transparency of the source dynamic image, and at the same time, fading in the target dynamic image by gradually reducing the transparency of the target dynamic image.

14. A method for processing a game capable of displaying dynamic images, comprising:

displaying a first dynamic image depicted from a first viewpoint, comprising a plurality of image frames;

when an actual viewpoint of an actual dynamic image to be displayed is changed, reciprocally adjusting a brightness of one image frame of said first dynamic image and a brightness of one image frame of a second dynamic image depicted from a second viewpoint, comprising a plurality of image frames, acquiring a synthesized image frame by synthesizing the corresponding two image frames whose brightnesses were adjusted, displaying the corresponding synthesized image frame; and subsequently mutually selecting the brightness of the next image frame of said first dynamic image, and brightness of the next image frame of said second dynamic image whenever image frames to be displayed are renewed;

reciprocally adjusting the brightness of the synthesized image frame acquired by the last synthesis, and brightness of the reciprocally selected next image frame;

acquiring a newly synthesized image frame by synthesizing said synthesized image frame whose brightness has been previously adjusted, and said image frame; and displaying the corresponding synthesized image frame.

15. The method of claim 14, further comprising:

adjusting the brightness of an image frame and a synthesized image frame by adjusting the quantity of reduction in brightness thereof; and acquiring said synthesized image frame by translucent synthesis.

16. The method for processing a game capable of displaying dynamic images as set forth in claim 15, further comprising:

with respect to adjustment of the brightness of image frames of said first dynamic image, adjusting the quantity of reduction in brightness so that the brightness becomes low whenever the next image frame is selected, and with respect to adjustment of the brightness of image frames of said second dynamic image, adjusting the quantity of reduction in brightness so that the brightness becomes high whenever the next image frame is selected.

17. A method for processing a game capable of displaying dynamic images, comprising:
  displaying a first dynamic image depicted from a first viewpoint, comprising a plurality of image frames;
  when an actual viewpoint of an actual dynamic image to be displayed is changed, reciprocally adjusting a brightness of one image frame of said first dynamic image and a brightness of one image frame of a second dynamic image depicted from a second viewpoint, comprising a plurality of image frames, whenever the image frame to be displayed is renewed;
  acquiring a synthesized image frame by synthesizing the corresponding two image frames whose brightness has been adjusted; and
  displaying the corresponding synthesized image frame.

18. The method for processing a game capable of displaying dynamic images, as set forth in claim 17, further comprising:
  with respect to image frames of said first dynamic image, adjusting the brightness so that the brightness gradually becomes low whenever a next image frame is selected; and
  with respect to image frames of said second dynamic images, adjusting the brightness so that the brightness gradually becomes high when a next image frame is selected.

19. A game processing apparatus for executing a game by displaying images on a monitor display, comprising:
  a recording medium readable by a computer, having a program stored therein to execute a game;
  the computer for executing said program by reading at least one part of said program from said recording medium; and
  the monitor display for displaying images of said game resulting from the program;
  wherein, by reading at least one part of said program from said recording medium, said computer:
    displays dynamic images;
    when an actual viewpoint for an actual dynamic image to be displayed is changed, translucently synthesizes a source dynamic image depicted from a first viewpoint before the actual viewpoint is changed, and a target dynamic image depicted from a second viewpoint after the actual viewpoint is changed, together frame by frame in respective images; and
    when the actual viewpoint for the actual dynamic image to be displayed is changed, fades out the source dynamic image by gradually increasing transparency of the source dynamic image, and at the same time, fades in the target dynamic image by gradually reducing the transparency of the target dynamic image.

20. A game processing apparatus for creating a game by displaying images on a monitor display, comprising:
  a recording medium readable by a computer, having a program stored therein to execute the game;
  the computer for executing said program by reading at least one part of said program from said recording medium; and
  the monitor display for displaying images of said game which is executed by said program;
  wherein, by reading at least one part of said program from said recording medium, said computer:
    displays a first dynamic image depicted from a first viewpoint, comprising a plurality of image frames;
    when an actual viewpoint of an actual dynamic image to be displayed is changed, reciprocally adjusts a brightness of one image frame of said first dynamic image and a brightness of one image frame of a second dynamic image depicted from a second viewpoint, comprising a plurality of image frames,
    acquires a synthesized image frame by synthesizing the corresponding two image frames whose brightnesses were adjusted, and displays the corresponding synthesized image frame;
    subsequently mutually selects a brightness of a next image frame of said first dynamic image, and brightness of a next image frame of said second dynamic image whenever image frames to be displayed are renewed;
    reciprocally adjusts the brightness of the synthesized image frame acquired by the last synthesis, and brightness of the reciprocally selected next image frame;
    acquires a newly synthesized image frame by synthesizing said synthesized image frame whose brightness has been previously adjusted, and said image frame, and
    displays the corresponding synthesized image frame.

21. The game processing apparatus as set forth in claim 20, wherein the brightness of an image frame and a synthesized image frame is adjusted by adjusting the quantity of reduction in brightness thereof, and said synthesized image frame is acquired by translucent synthesis.

22. The game processing apparatus as set forth in claim 21, wherein with respect to adjustment of the brightness of image frames of said first dynamic images, the quantity of reduction in brightness is adjusted so that the brightness becomes low whenever a next image frame is selected, and with respect to adjustment of the brightness of image frames of said second dynamic images, the quantity of reduction in brightness is adjusted so that the brightness becomes high whenever a next image frame is selected.

23. A game processing apparatus for executing a game by displaying images on a monitor display, comprising:
  a recording medium readable by a computer, having a program stored therein to execute the game;
  the computer for executing said program by reading at least one part of said program from said recording medium; and
  the monitor display for displaying images of said game executed by said program;
  wherein, by reading at least one part of said program from said recording medium, said computer:
    displays a first dynamic image depicted from a first viewpoint, comprising a plurality of image frames;
    when an actual viewpoint of an actual dynamic image to be displayed is changed, reciprocally adjusts a brightness of one image frame of said first dynamic image and a brightness of one image frame of a second dynamic images depicted from a second viewpoint, comprising a plurality of image frames, whenever the image frame to be displayed is renewed;
    acquires a synthesized image frame by synthesizing the corresponding two image frames whose brightness has been adjusted; and
    displays the corresponding synthesized image frame.

24. The game processing apparatus as set forth in claim 23, wherein the brightness of image frames of said first dynamic images is adjusted so that the brightness gradually becomes low whenever a next image frame is selected, and the brightness of image frames of said second dynamic images is adjusted so that the brightness gradually becomes high whenever a next image frame is selected.

25. A game processing apparatus for executing a game by displaying images on a monitor display, comprising:

a recording medium, readable by a computer, having a program stored therein to execute the game;

a computer that executes said program by reading at least one part of said program from said recording medium;

the monitor display that displays images of said game executed by said program; and a depiction buffer memory, a first display buffer memory and a second display buffer memory and a second buffer comprising buffer memories for storing image data;

wherein, by reading at least a part of said program from said recording medium, said computer executes a display process that fades out screen display of the last scene by the image data from the last viewpoint, and fades in screen display of a new scene by image data from a new viewpoint, wherein:

(1) image data from the new viewpoint is written in said depiction buffer memory, the image data from the last viewpoint, which are displayed on a screen at present and written in said first display buffer memory are overwritten in said depiction buffer memory, and the image data from the last viewpoint are translucently synthesized with the image data from the new viewpoint at transparency equivalent to opaqueness;

(2) the image data in said depiction buffer memory after the translucent synthesis are copied in said second display buffer memory, and screen display is processed with respect to the image data of the corresponding second display buffer memory, wherein the next image data from the last viewpoint are written in said depiction buffer display, the translucently synthesized image data which are displayed on a screen at present and are written in said second display buffer memory are overwritten in said depiction buffer memory, and translucently synthesized image data from said second display buffer memory are translucently synthesized with the image data from the last viewpoint at a transparency equivalent to pellucidity;

(3) the image data in said depiction buffer memory after the translucent synthesis are copied in said first display buffer memory, and screen display is processed with respect to the image data of the corresponding first display buffer memory, wherein the next image data from the new viewpoint are written in said depiction buffer display, the translucently synthesized image data which are displayed at present and are written in said first display buffer memory are overwritten in said depiction buffer memory, and translucently synthesized image data from said first display buffer memory are translucently synthesized with the image data from the new viewpoint at a transparency equivalent to pellucidity; and (4) thereafter (2) and (3) are reciprocally repeated until a change of the screen display is completed, wherein, in the translucent synthesis in (2), the transparency of the translucently synthesized image data from said second display buffer memory is gradually reduced with respect to the image data from the last viewpoint, and in the translucent synthesis in (3), the transparency of the translucently synthesized image data from said first buffer memory is gradually raised with respect to the image data from the new viewpoint.

* * * * *